(12) United States Patent
Oyman et al.

(10) Patent No.: US 12,238,158 B2
(45) Date of Patent: *Feb. 25, 2025

(54) SESSION DESCRIPTION PROTOCOL (SDP) BASED SIGNALING OF CAMERA CALIBRATION PARAMETERS

(71) Applicant: Intel Corporation, Santa Clara, CA (US)

(72) Inventors: Ozgur Oyman, Palo Alto, CA (US); Gang Shen, Hillsboro, OR (US); Wenqing Fu, Portland, OR (US); Wei Zong, Beijing (CN); Juan Zhao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,277

(22) Filed: Oct. 24, 2023

(65) Prior Publication Data

US 2024/0187469 A1    Jun. 6, 2024

Related U.S. Application Data

(63) Continuation of application No. 17/112,370, filed on Dec. 4, 2020, now Pat. No. 11,838,345.

(Continued)

(51) Int. Cl.
*H04L 65/65* (2022.01)
*G06T 7/80* (2017.01)
(Continued)

(52) U.S. Cl.
CPC .............. *H04L 65/65* (2022.05); *G06T 7/85* (2017.01); *H04L 65/61* (2022.05); *H04L 67/141* (2013.01); *H04L 67/142* (2013.01)

(58) Field of Classification Search
CPC ....... H04L 65/65; H04L 65/61; H04L 67/141; G06T 7/85
See application file for complete search history.

(56) References Cited

U.S. PATENT DOCUMENTS 10,484,447 B2 * 11/2019 Asveren ................ H04L 65/764
2019/0104326 A1    4/2019 Stockhammer et al.

OTHER PUBLICATIONS

3GPP, "Technical Specification Group Services and System Aspects; IP Multimedia Subsystem (IMS); Multimedia Telephony; Media handling and interaction (Release 16)," 3GPP TS 26.114 V16.3.0 (Sep. 2019), 5G, 431 pages.

(Continued)

*Primary Examiner* — Nazia Naoreen
(74) *Attorney, Agent, or Firm* — Schwabe, Williamson & Wyatt, P.C.

(57) ABSTRACT

Various embodiments herein provide techniques for Session Description Protocol (SDP)-based signaling of camera calibration parameters for multiple video streams. In embodiments, a device may receive an SDP attribute to indicate that a bitstream included in a real-time transport protocol (RTP)-based media stream includes camera calibration parameters. The device may obtain the camera calibration parameters based on the SDP attribute, and process the RTP-based media stream based on the camera calibration parameters. In embodiments, the camera calibration parameters may be used to stitch together (e.g., align and/or synchronize) the multiple video streams. In embodiments, the stitched video streams may form an immersive video content (e.g., 360-degree video content). Other embodiments may be described and claimed.

19 Claims, 15 Drawing Sheets

Related U.S. Application Data

(60) Provisional application No. 62/944,959, filed on Dec. 6, 2019.

(51) Int. Cl.
    *H04L 65/61*     (2022.01)
    *H04L 67/141*    (2022.01)
    *H04L 67/142*    (2022.01)

(56) References Cited

OTHER PUBLICATIONS

3GPP, "Technical Specification Group Services and System Aspects; Virtual Reality (VR) profiles for streaming applications (Release 15)," 3GPP TS 26.118 V15.2.0 (Sep. 2019), 5G, 69 pages.
3GPP, "Technical Specification Group Services and System Aspects; Telepresence using the IP Multimedia Subsystem (IMS); Media Handling and Interaction (Release 16)," 3GPP TS 26.223 V16.0.0 (Mar. 2019), 5G, 41 pages.
3GPP, "Technical Specification Group Services and System Aspects; Uplink Streaming (Release 16)," 3GPP TS 26.238 V16.2.0 (Sep. 2019), 5G, 43 pages.
United States Patent Office—Office Action mailed Jan. 20, 2023, from U.S. Appl. No. 17/112,370, 9 pages.

\* cited by examiner

Example Signaling flow for immersive conferencing with in-camera stitching

Figure 8.2 – Example Signaling flow for immersive conferencing with network-based stitching

SESSION DESCRIPTION PROTOCOL (SDP) BASED SIGNALING OF CAMERA CALIBRATION PARAMETERS

CROSS REFERENCE TO RELATED APPLICATION

The present application is a continuation of U.S. patent application Ser. No. 17/112,370, which was filed Dec. 4, 2020; which claims priority to U.S. Provisional Patent Application No. 62/944,959, which was filed Dec. 6, 2019; the entire disclosures of which are hereby incorporated by reference.

FIELD

The 360-degree video cameras in the market vary significantly. They have various numbers of lenses, such as 2 lenses, 3 lenses, 6 lenses, or even more. Additionally, there is not a standard way for a device to align the stitching operations. The users must design the methods per platform, or the Hardware provider must provide the stitching software directly. Users may not be satisfied by the stitching quality and cannot do the customization, for example, analysis before the stitching action. Furthermore, it is sometimes necessary to stitch the videos in the remote server which requires data transportation through the network.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments provide a common way to share the camera calibration data for further 360-degree video stitching and generation, which may be used with different types of cameras. For example, embodiments provide new Session Description Protocol (SDP) based signaling of camera calibration parameters to be used for aligning and synchronizing captured video streams for 360-degree video stitching. The embodiments may enable network-based stitching and/or empower the remote server to do analysis on raw separate videos before stitching.

In embodiments, a device may receive an SDP attribute to indicate that a bitstream included in a real-time transport protocol (RTP)-based media stream includes camera calibration parameters. The device may obtain the camera calibration parameters based on the SDP attribute, and process the RTP-based media stream based on the camera calibration parameters. In embodiments, the camera calibration parameters may be used to stitch together (e.g., align and/or synchronize) the multiple video streams. In embodiments, the stitched video streams may form an immersive video content (e.g., 360-degree video content).

It is noted that the system may support full 360-degree video in some embodiments. However, use cases or implementations may restrict the field of view (e.g., to enhance user experience). Accordingly, the reference to 360-degree video is not intended to be limiting, and embodiments may be applied to any suitable type/format of immersive media (e.g., with narrower field of view, such as 180 degrees to 360 degrees).

Use Cases

Figure 1:
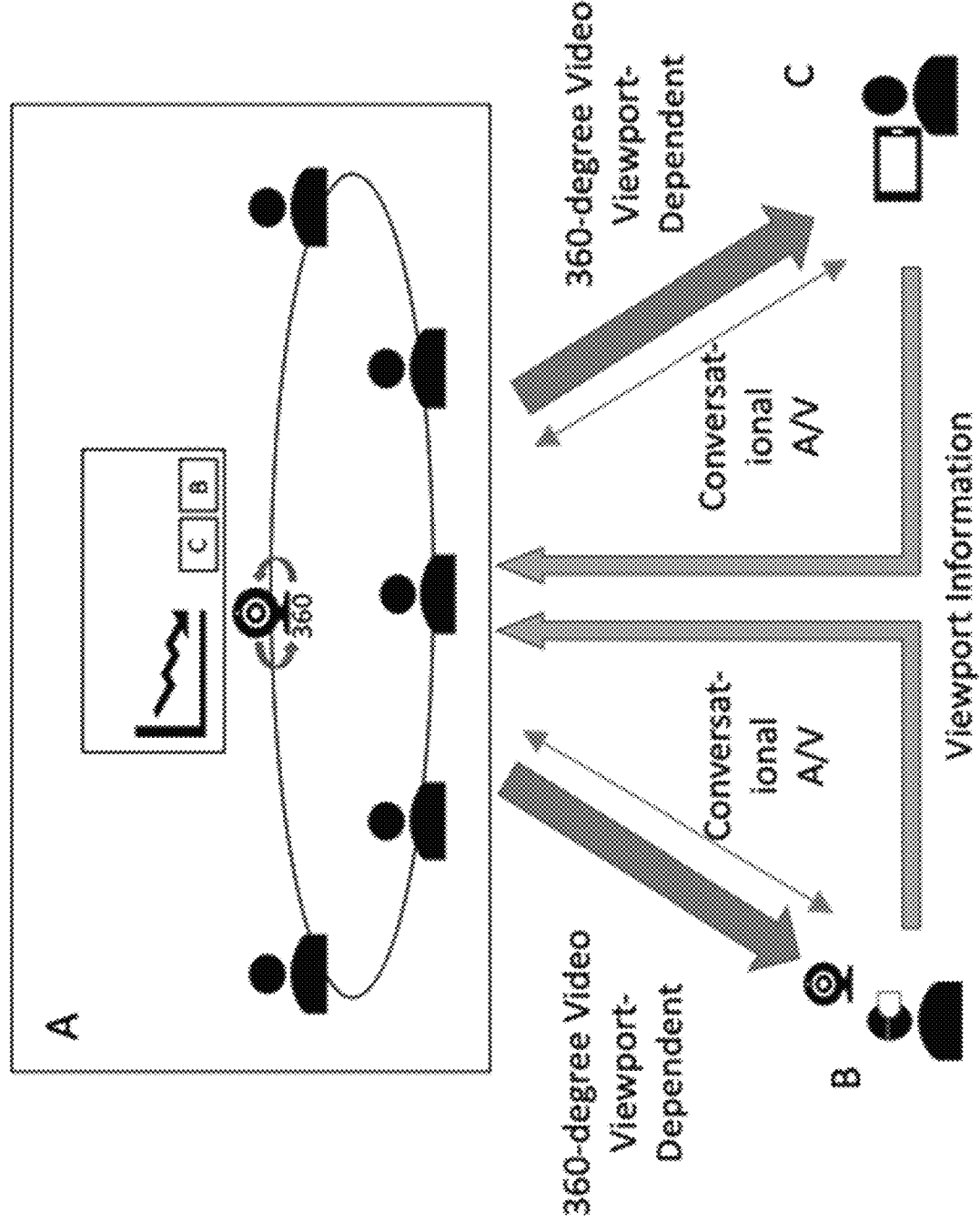
FIG. 1 illustrates a 360-degree conference call environment, in accordance with various embodiments.

A group of colleagues are having a meeting in conference room A (see FIG. 1). The room consists of a conference table (for physically present participants), a 360-degree camera, and a view screen. Two of their colleagues, Bonnie (B) and Clyde (C) are travelling and join the meeting through a conference call.

Participants in conference room A use the screen to display a shared presentation and/or video streams coming from Bonnie and Clyde.

Bonnie joins the conference from her home using a Head Mounted Display (HMD) and a camera that captures her video. She has a 360-degree view of the conference room.

Clyde joins the conference from the airport using his mobile phone. He also has a 360-degree view of the conference room on his mobile screen and uses his mobile camera for capturing his own video.

Both Bonnie and Clyde can see the screen in the conference room as part of the 360-degree video. They also have the option to bring into focus {} any of the incoming video streams (presentation or the other remote participant's camera feed) using their own display devices. The manner in which this focused stream is displayed is a function of their display device and is not covered in this use case.

Within the 3GPP MTSI Technical Standard (TS) 26.114 and Telepresence TS 26.223 [2] specifications, the above use case can be realized in two possible configurations, which are explained below. The participants are referred to as A, B and C from here onwards.

In the first scenario, shown in FIG. 1, the call is set up without the support of any media-aware network elements. Both remote participants, B and C, send information about their viewport orientation to A, which in turn sends them a viewport-dependent video stream from the omnidirectional camera.

Figure 2:
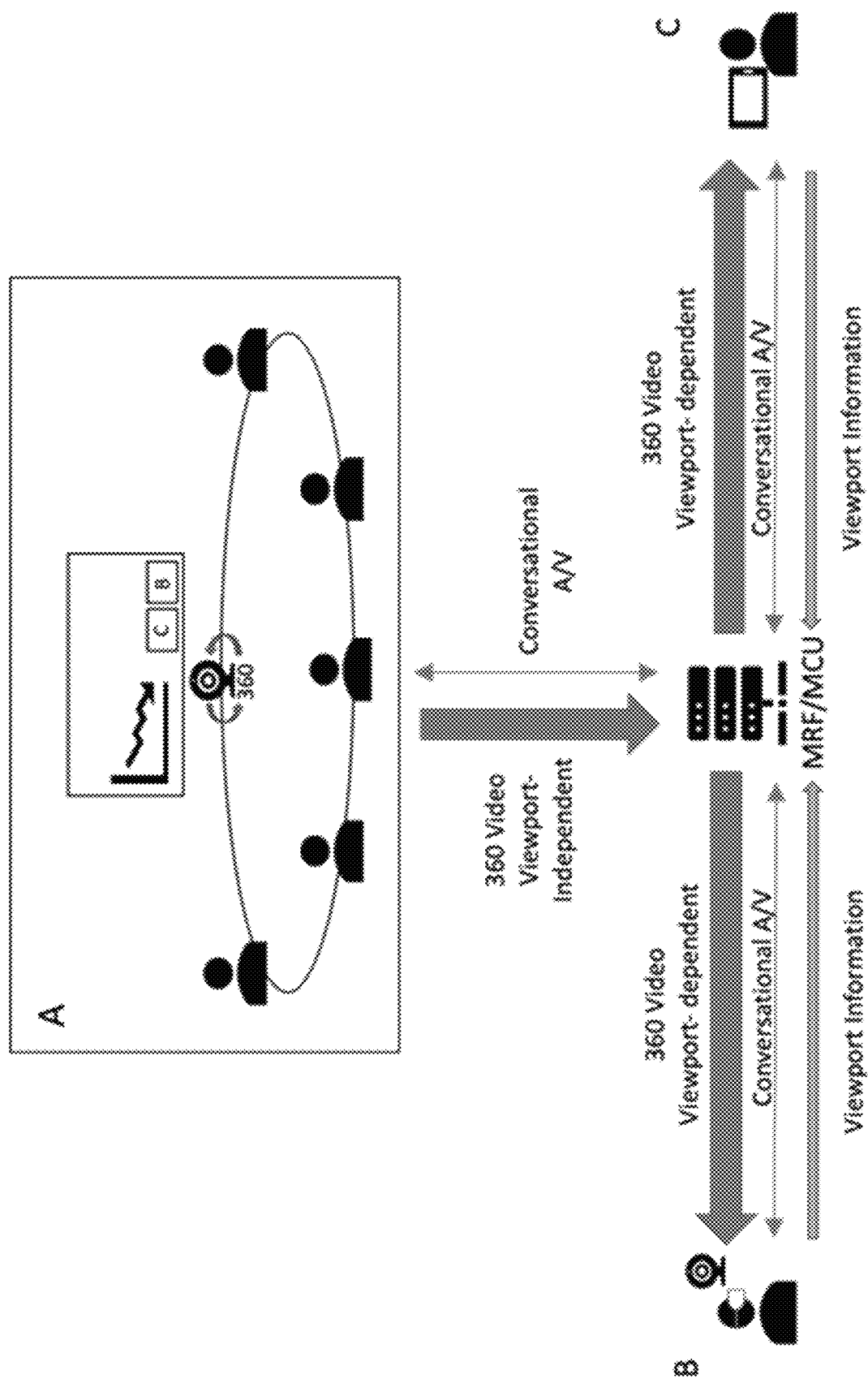
FIG. 2 illustrates a 360-degree conference call environment using a media resource function (MRF) and/or a media control unit (MCU), in accordance with various embodiments.

In the second scenario, the call is setup using a network function, which may be performed by either a Media Resource Function (MRF) (e.g., for MTSI) or a Media Control Unit (MCU) (e.g., for Telepresence). In this case, the MRF/MCU receives a viewport-independent stream from A. Both B and C, send viewport orientation information to the MRF/MCU and receive viewport-dependent streams from it. FIG. 2 illustrates the scenario. The audio/video (A/V) channel for conversational non-immersive content also flows through the MRF/MCU in the figure. However, it should be possible to maintain this channel directly between the conference call participants.

The use case aims to enable immersive experience for remote terminals joining teleconferencing and telepresence sessions, with two-way audio and one-way immersive video, e.g., a remote single user wearing a head-mounted display (HMD) participates to a conference will send audio and optionally 2D video (e.g., of a presentation, screen sharing and/or a capture of the user itself), but receives stereo or immersive voice/audio and immersive video captured by an omnidirectional camera in a conference room connected to a fixed network. Furthermore, 1) Multiple single-user participants are allowed. Communications between the single users may be conventional MTSI/Telepresence communications. Multi-stream MTSI (MSMTSI) may be used, and if that is used, then media data can be transmitted in separate media streams, and the layout of different participants is up to the client application/implementation.

2) One 360 camera per location in multi-party conference scenarios involving multiple physical locations are allowed.

3) Both in-camera stitching and network-based stitching are allowed. In case of camera stitching, stitched immersive video is sent from the conference room to the conferencing server (e.g., MSMTSI MRF or any other media gateway) and then from the conferencing server to the remote participants. If this is a one-to-one conversational session between the conferencing room and the remote participant, a media gateway in the middle may not be necessary. In case of network-based stitching, different 2D captures are sent from the conference room to the conferencing server and the conferencing server performs decoding, stitching, and re-encoding to produce the immersive video, which is then distributed to the remote participants.

Recommended Features

It is recommended that MTSI and IMS Telepresence endpoints support codec, protocol and transport capabilities relevant for encoding, delivery and consumption of immersive speech/audio and immersive video.

Capability for the party that sends 360-degree video to send viewport-dependent and/or viewport-independent streams.

Timely delivery of the changes in viewport orientation from the remote participants, and appropriate low-delay actions to update the viewport-dependent streams. Any changes in viewport orientation should not lead to latency-prone signaling, such as SIP renegotiations.

Capability to create viewport-dependent streams for individual UEs including a larger area of the original viewport for safe playback in the UE.

A suitable coordinate system to be used as the standard way of communicating the orientation of the viewport.

Given possible end device limitations as well as potential constraints on the conference room equipment, network-based processing should be considered for media workloads involving both conference room and remote participants, e.g., stitching of captured streams from the conference room, media composition, transcoding and prerendering for the remote participant, etc.

The following parameters need to be signaled in the SDP during call setup in addition to normal MTSI call signaling.

1. Initial viewport orientation. It is the default orientation from which to start the view at the receivers' side.
2. Decoding/Rendering metadata, e.g., region-wise packing information, projection mapping information, frame packing information, etc. It is subject of discussion whether this information is signaled via SDP and/or within SEI messages with the media stream.
3. Capture Field-of-View (CFoV): as discussed during the definition of the use case, the system supports transmission of 360-degree video. However, the range of the FoV may be restricted in order to enhance user experience. The negotiation requires signaling the capture FoV of the capture device, and a response carrying the receiver's preferred FoV (PFoV) depending on the remote UE, where the preferred FoV will be less than or equal to the captured FoV.
4. Codec negotiation Architecture The current MTSI service architecture depicted in FIG. 4.1 of 3GPP TS 26.114 is applicable for immersive teleconferencing. No further architectural gaps are identified.

In terms of the reuse of existing MTSI functionality, the following may be observed:

1—For in-camera stitching, stitched immersive video is sent from the conferencing room to the conferencing server (e.g., MSMTSI MRF) or directly to the remote participant (e.g., one-to-one conversation) in one or more RTP streams (e.g., established via SDP). Multiple RTP streams may be used in case tile or sub-picture based delivery optimization is in use.

2—For network-based stitching, multiple RTP streams are established (e.g., via SDP, using MSMTSI) between the conferencing server and conference room, each of which carries a particular 2D capture. These RTP streams are then sent from the conference room to the conferencing server and the conferencing server performs decoding, stitching, and re-encoding to produce one or more RTP streams containing the immersive video, which are then distributed to the remote participants (e.g., again via MSMTSI). Multiple RTP streams may be used for the immersive video in case tile or sub-picture based delivery optimization is in use.

Potential Solutions

Figure 3:
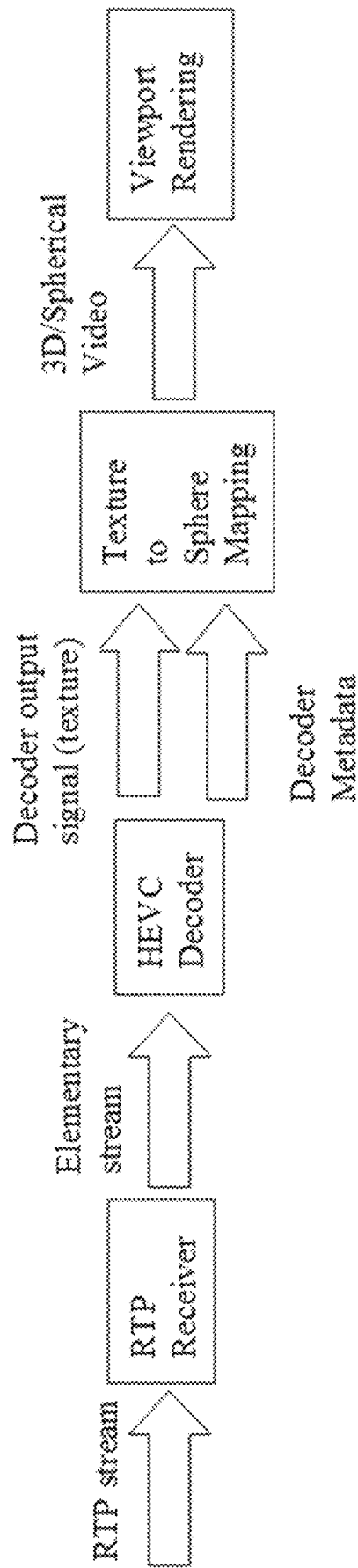
FIG. 3 illustrates an example receiver architecture for virtual reality (VR) support over multimedia telephony service over Internet Protocol (IP) Media Subsystem (IMS) (MTSI), in accordance with various embodiments.

FIG. 3 provides an overview of a possible receiver architecture that reconstructs the spherical video in an MTSI or IMS Telepresence UE. Note that this figure does not represent an actual implementation, but a logical set of receiver functions. Based on one or more received real-time transport protocol (RTP) media streams, the UE parses, possibly decrypts and feeds the elementary stream to the high efficiency video coding (HEVC) decoder. The HEVC decoder obtains the decoder output signal, referred to as the "texture", as well as the decoder metadata. The Decoder Metadata contains the Supplemental Information Enhancement (SEI) messages, e.g., information carried in the omnidirectional video specific SEI messages, to be used in the rendering phase. In particular, the Decoder Metadata may be used by the Texture-to-Sphere Mapping function to generate a spherical video (or part thereof) based on the decoded output signal, e.g., the texture. The viewport is then generated from the spherical video signal (or part thereof) by taking into account the viewport position information from sensors, display characteristics as well as possibly other metadata such as initial viewport information.

For 360 degree video, the potential solutions can consider the following principles:

The RTP stream would contain an HEVC bitstream with omnidirectional video specific SEI messages. In particular, the omnidirectional video specific SEI messages as defined in ISO/IEC 23008-2 [3] may be present.

The video elementary stream(s) may be encoded following the requirements in the Omnidirectional Media Format (OMAF) specification ISO/IEC 23090-2, clause 10.1.2.2.

Relevant SEI messages contained in the elementary stream(s) with decoder rendering metadata may include the following information as per ISO/IEC 23008-2:

Region-wise packing information, e.g., carrying region-wise packing format indication and also any coverage restrictions Projection mapping information, indicating the projection format in use, e.g., Equi-Rectangular Pprojection (ERP) or Cubemap projection (CMP)

Padding, indicating whether there is padding or guard band in the packed picture Frame packing arrangement, indicating the frame packing format for stereoscopic content Content pre-rotation information, indicating the amount of sphere rotation, if any, applied to the sphere signal before projection and region-wise packing at the encoder side The output signal, e.g., the decoded picture or "texture", is then rendered using the Decoder Metadata information contained in relevant SEI messages contained in the video elementary streams. The Decoder Metadata is used when performing rendering operations such as region-wise unpacking, projection de-mapping and rotation toward creating spherical content for each eye.

Viewport-dependent processing could be supported for both point-to-point conversational sessions and multiparty conferencing scenarios and be achieved by sending from the MTSI receiver RTCP feedback or RTP header extension messages with the desired viewport information and then encoding and sending the corresponding viewport by the MTSI sender or by the media gateway, e.g., MRF. This is expected to deliver resolutions higher than the viewport independent approach for the desired viewport. The transmitted RTP stream from the MTSI sender or media gateway may also include the actual viewport or coverage information, e.g., in an RTP header extension message, as the 360 degree video generated, encoded and streamed by the sender may cover a larger area than the desired viewport. The media formats for tiling and sub-picture coding as described in the viewport-dependent profile of OMAF in ISO/IEC 23090-2, etc., are not relevant for the 5G conversational setting. Instead, viewport-dependent processing based on tiling and sub-picture coding could be realized via RTP/RTCP based protocols that are supported by MTSI and IMS-based telepresence.

OMAF video profiles specified in ISO/IEC 23090-2 are based on HEVC Main 10 Profile, Main Tier, Level 5.1 in order to deliver high quality VR experiences. In the meantime, MTSI in 3GPP TS 26.114 mandates H.265 (HEVC) Main Profile, Main Tier, Level 3.1 for video, and IMS telepresence in 3GPP TS 26.223 mandates H.265 (HEVC) Main Profile, Main Tier, Level 4.1 for video.

For achieving video quality required by VR services, it may be recommended that the video codecs for VR support in MTSI and IMS telepresence are aligned with OMAF and/or 3GPP TS 26.118, e.g., HEVC Main 10 Profile, Main Tier, Level 5.1 may be recommended for MTSI and IMS telepresence in TS 26.114 and TS 26.223 to ensure a high-quality VR experience. It is expected that both MTSI client and MTSI gateway codec requirements are aligned with these recommended video codec requirements for VR support. It is not expected that the mechanisms for session setup and negotiation would be different because of this changed requirement on video codecs.

With regards to the negotiation of SEI messages for carriage of decoder rendering metadata, procedures specified in IETF RFC 7798 on the RTP payload format for HEVC may be reused. In particular, RFC 7798 can allow exposing SEI messages related to decoder rendering metadata for omnidirectional media in the SDP using the 'sprop-sei' parameter, which allows to convey one or more SEI messages that describe bitstream characteristics. When present, a decoder can rely on the bitstream characteristics that are described in the SEI messages for the entire duration of the session. Intentionally, RFC 7798 does not list an applicable or inapplicable SEI messages to be listed as part of this parameter, so the newly defined SEI messages for omnidirectional media in ISO/IEC 23008-2 can be signaled. It is expected that both MTSI clients and MTSI gateways support RTP payload formats for VR support.

For most one-to-one video telephony and multi-party video conferencing scenarios, it is expected that support of the following omnidirectional video specific SEI messages would be sufficient:

1) the equirectangular projection SEI message,
2) the cubemap projection SEI message,
3) the sphere rotation SEI message, and
4) the region-wise packing SEI message.

For stereoscopic video support, in either one-to-one video telephony scenarios or multi-party video conferencing scenarios, support of a subset of the frame packing arrangement SEI message as in ISO/IEC 23090-2 is also needed.

Based on the above, an SDP framework for immersive video exchange needs to be developed to negotiate codec support, SEI messages for decoder rendering metadata, as well as RTP/RTCP signaling necessary for viewport dependent processing. These capabilities may be individually negotiated, but to simplify the SDP exchange and avoid fragmentation of capabilities it would be more preferable to specify one or more MTSI client profiles and develop the SDP framework based on these profiles.

Such an example compact SDP negotiation framework is described below.

A new SDP attribute 3gpp_360video may be defined with the following ABNF:

3gpp_360video ="a=3gpp_video:" [SP "VDP" SP "Stereo"]

A potential specification for the semantics of the above attribute and parameter is provided below. Unsupported parameters of the 3gpp_360video attribute may be ignored.

An MTSI terminal supporting the 360 video feature without using viewport-dependent processing (VDP) or stereoscopic video for video may support the following procedures:
- when sending an SDP offer, the MTSI client includes the 3gpp_360video attribute in the media description for video in the SDP offer
- when sending an SDP answer, the MTSI client includes the 3gpp_360video attribute in the media description for video in the SDP answer if the 3gpp_360video attribute was received in an SDP offer
- after successful negotiation of the 3gpp_360video attribute in the SDP, for the video streams based on the HEVC codec, the MTSI clients exchange an RTP-based video stream containing an HEVC bitstream with omnidirectional video specific SEI messages as defined in ISO/IEC 23008-2 [3] with the following characteristics:
  - OMAF video profiles specified in ISO/IEC 23090-2 [4] are based on HEVC Main 10 Profile, Main Tier, Level 5.1 are supported.
  - exchange of the following SEI messages are supported: (i) the equirectangular projection SEI message, (ii) the cubemap projection SEI message, (iii) the sphere rotation SEI message, and (iv) the region-wise packing SEI message.

Note: This attribute may be used to negotiate 360 video capabilities for video streams in a codec-agnostic fashion. The semantics of 3gpp_360video attribute for video streams based on AVC (which is the other mandatory codec for MTSI) is TBD.

An MTSI terminal supporting the 360 video feature supporting use of viewport-dependent processing (VDP) would include the VDP parameter and further support the following procedures:
- the RTCP feedback (FB) message described in clause 9.2 type to carry desired or requested viewport information during the RTP streaming of media (signaled from the MTSI receiver to the MTSI sender). When the predefined viewport mode of viewport-dependent processing is negotiated, additional SDP attributes may be signaled in addition to VDP, e.g., as per a=predefined_viewport attribute described in clause 9.4.
- [the new RTP header extension type described in clause 9.3 to carry actually transmitted viewport information during the RTP streaming of media (signaled from the MTSI sender to the MTSI receiver).]

An MTSI terminal supporting the 360 video feature with stereoscopic video would include the Stereo parameter and additionally support frame packing arrangement SEI message as in ISO/IEC 23090-2 for HEVC.

Figure 4:
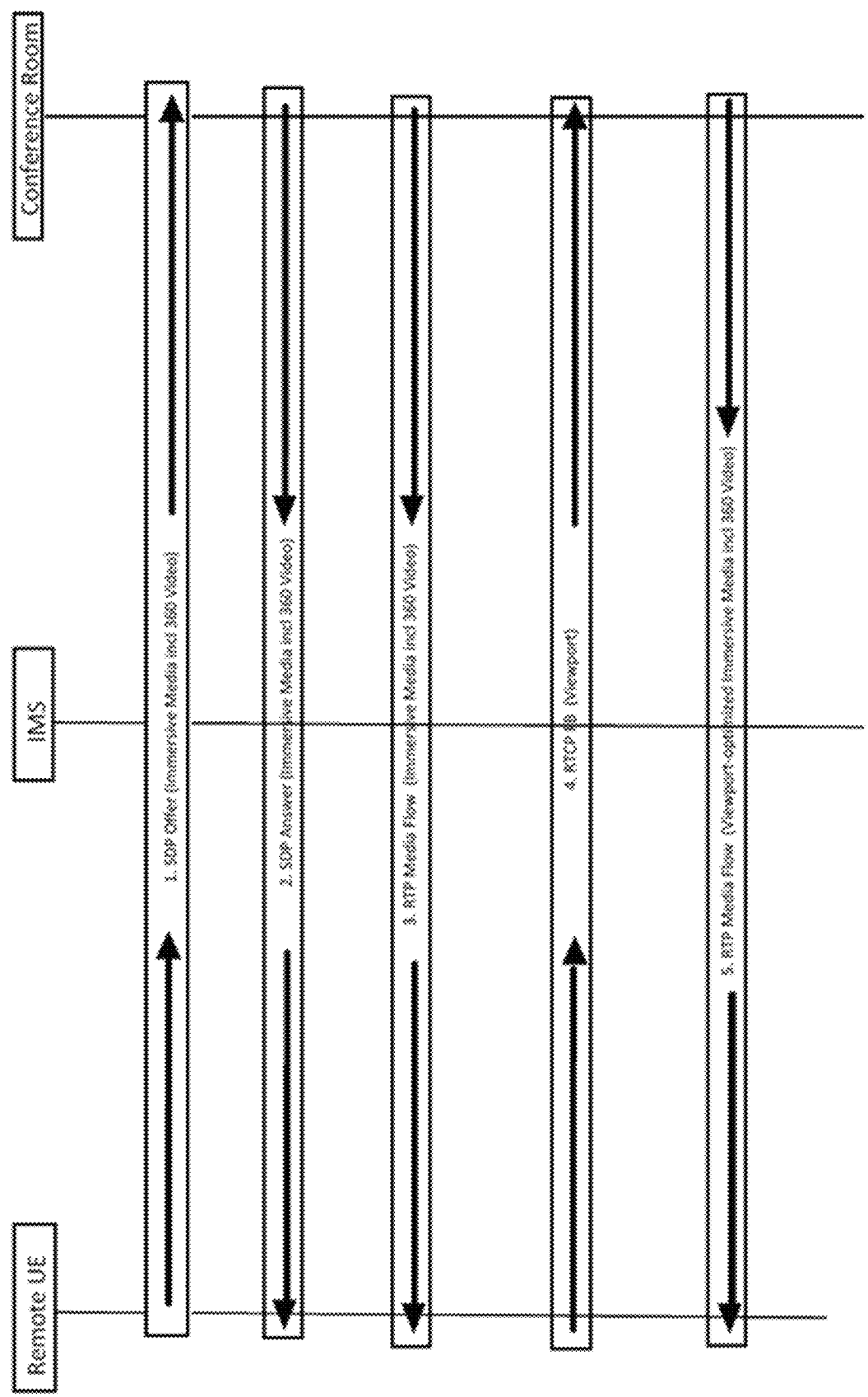
FIG. 4 illustrates an example signaling flow for immersive conferencing with in-camera stitching, in accordance with various embodiments.

Example Signaling Flows and Media Processing Procedures Immersive Teleconferencing with In-Camera Stitching For in-camera stitching, stitched immersive video is sent from the conferencing room to the conferencing server (e.g., MSMTSI MRF) or directly to the remote participant (e.g., one-to-one conversation) in one or more RTP streams (e.g., established via SDP). Multiple RTP streams may be used in case tile or sub-picture based delivery optimization is in use. We consider a point to point communications scenario in this example so there is no conferencing server in between. An example signaling flow is depicted in FIG. 4 and described further below.

1—The Remote Participant UE sends an SDP offer to the Conference Room Terminal indicating immersive media capabilities including 360 video support. Optionally, the Remote Participant UE may also include viewport-dependent processing capability in the SDP offer. Two or more RTP streams may be included in the SDP offer in case viewport-dependent processing is offered, e.g. one RTP stream for the base 360 video and another viewport-optimized RTP stream, with the high quality 360 video corresponding to the desired viewport.

2—The Conference Room Terminal responds to the Remote Participant UE with an SDP answer confirming immersive media capabilities including 360 video support. Optionally, the Conference Room Terminal may also accept viewport-dependent processing capability in the SDP answer. In case viewport-dependent processing is accepted, the SDP answer from the Conference Room Terminal may include multiple RTP streams.

3—The Conference Room Terminal streams the RTP media flow with immersive media including 360 video to the Remote Participant UE. 360 video transmission may be based on the RTP payload formats for HEVC that carry SEI messages describing immersive media metadata as described herein.

4—(Optional) The Remote Participant UE signals the desired Viewport Information to the Conference Room Terminal using a dedicated RTCP feedback message, e.g., based on the embodiments described herein.

5—(Optional) The Conference Room Terminal streams the viewport-optimized RTP media flow with immersive media including 360 video to the Remote Participant UE. Information on the actually transmitted viewport may also be included in the RTP media flow, e.g., based on the embodiments described herein. In case two RTP streams are negotiated, then the viewport-optimized RTP stream containing the high quality 360 video may contain this information.

8.2 Immersive Teleconferencing with Network-Based Stitching

Figure 5:
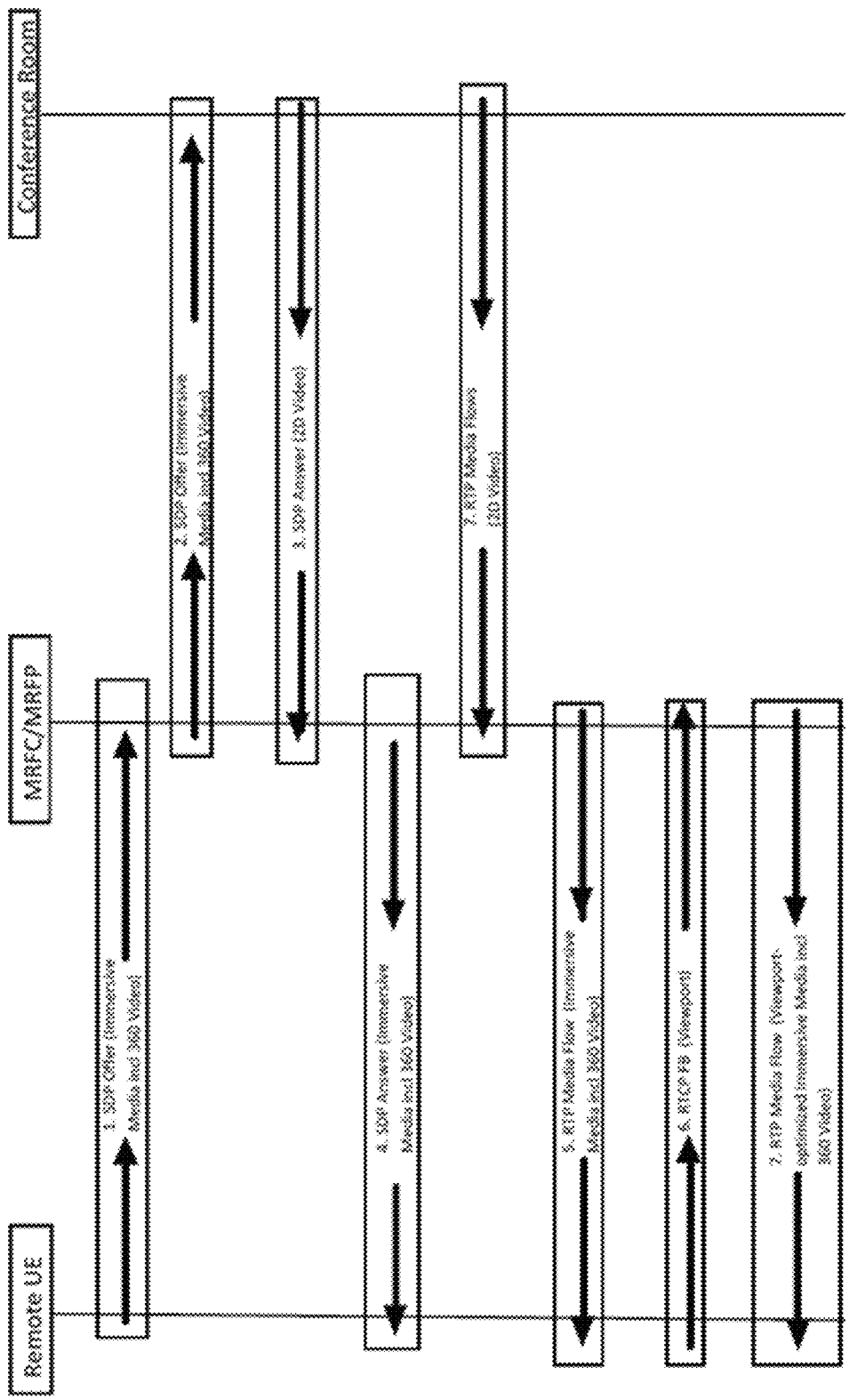
FIG. 5 illustrates an example signaling flow for immersive conferencing with network-based stitching, in accordance with various embodiments.
Figure 6:
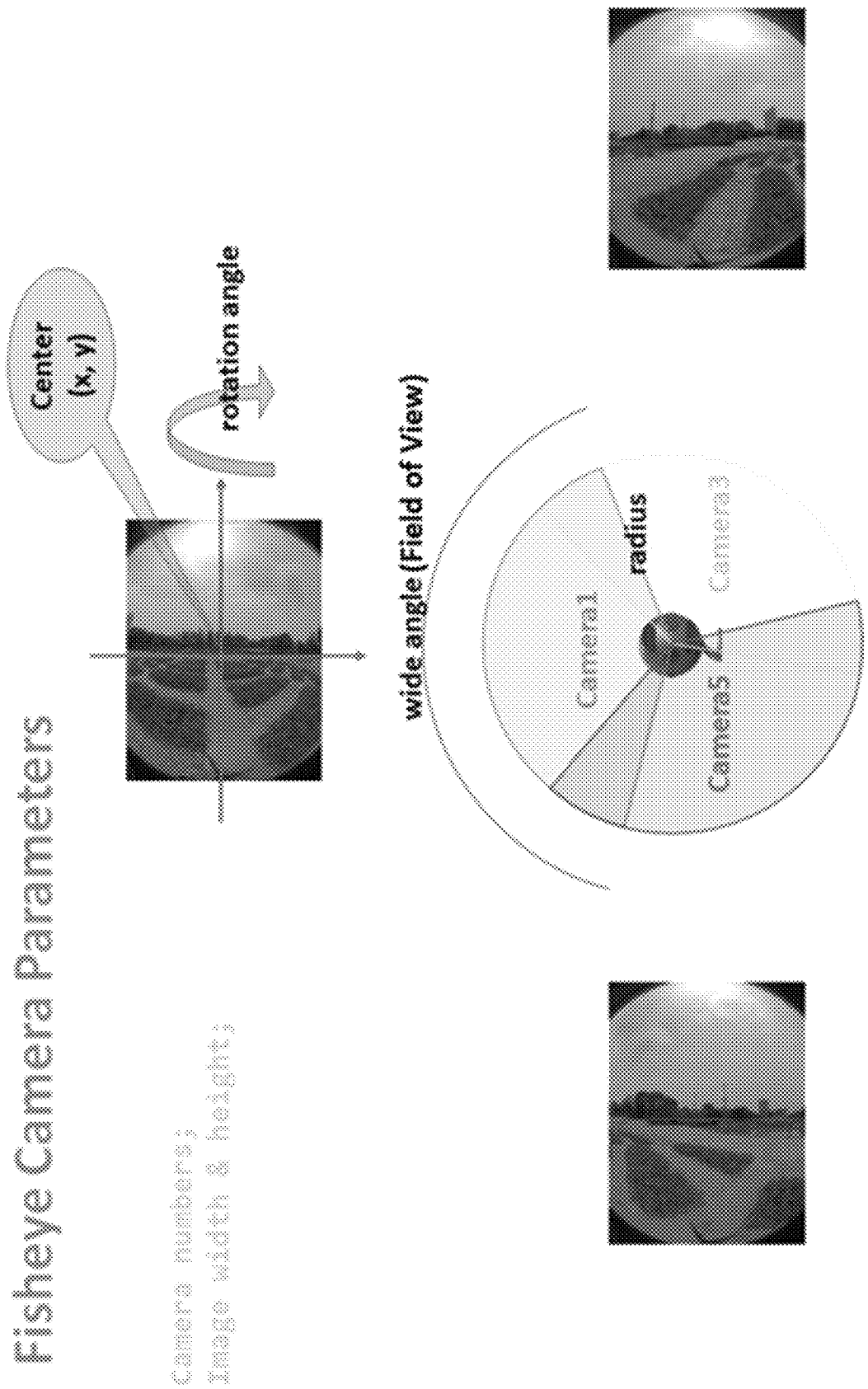
FIG. 6 illustrates example camera parameters, in accordance with various embodiments.
Figure 7:
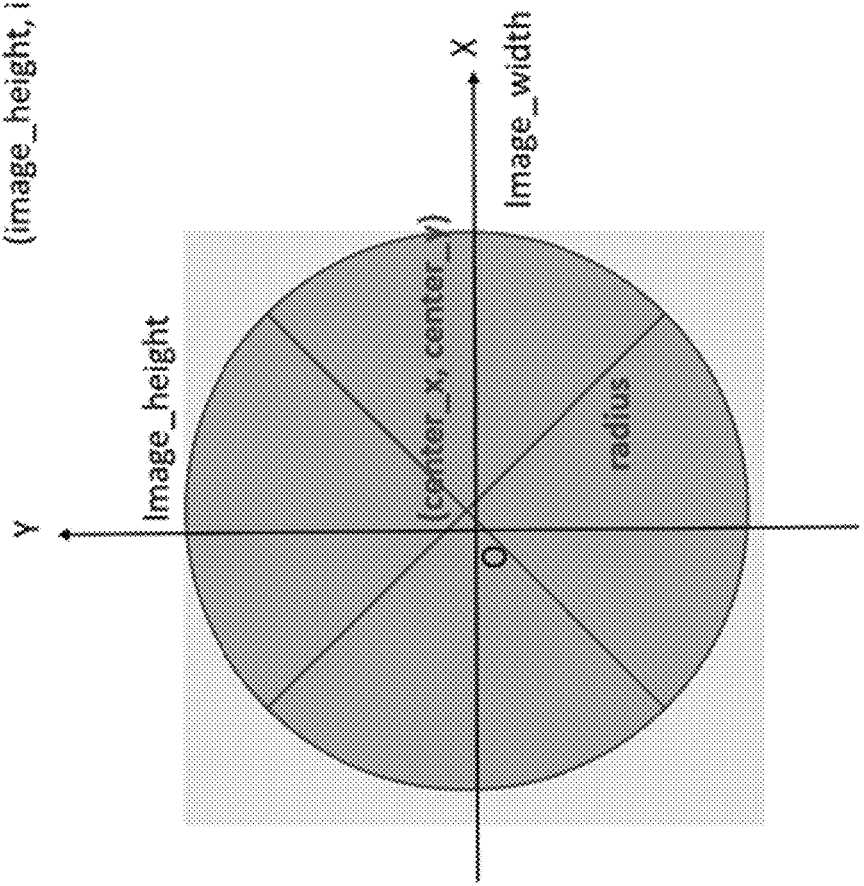
FIG. 7 illustrates example camera intrinsic parameters, in accordance with various embodiments.
Figure 8:
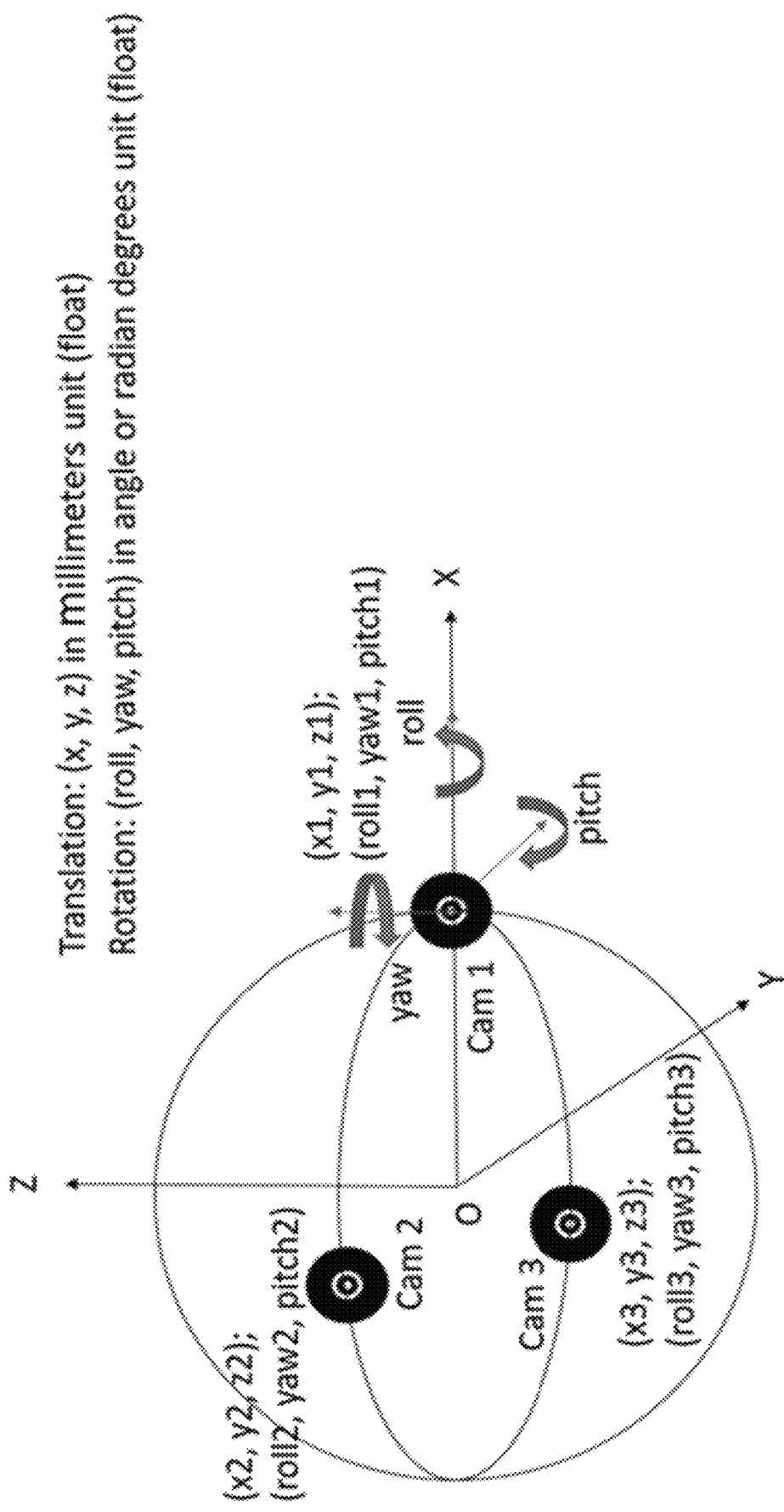
FIG. 8 illustrates example camera extrinsic parameters, in accordance with various embodiments.

For network-based stitching, multiple RTP streams are established (e.g., via SDP, using MSMTSI) between the conferencing server and conference room, each of which carries a particular 2D capture. These RTP streams are then sent from the conference room to the conferencing server and the conferencing server performs decoding, stitching, and re-encoding to produce one or more RTP streams containing the immersive video, which are then distributed to the remote participants (e.g., again via MSMTSI). Multiple RTP streams may be used for the immersive video in case tile or sub-picture based delivery optimization is in use. An example signaling flow is depicted in FIG. 5.

1—The Remote Participant UE sends an SDP offer to the Conferencing Server (e.g., MSMTSI MRF) indicating immersive media capabilities including 360 video support, e.g., based on the embodiments described herein. Optionally, the Remote Participant UE may also include viewport-dependent processing capability in the SDP offer, e.g., based on the embodiments described herein. Two or more RTP streams may be included in the SDP offer in case viewport-dependent processing is offered, e.g. one RTP stream for the base 360 video and another viewport-optimized RTP stream, with the high quality 360 video corresponding to the desired viewport.

2—The Conferencing Server forwards the SDP offer to the Conference Room Terminal to see it is capable of supporting immersive media. The SDP offer also indicates 2D video capabilities as a fallback in case the Conference Room Terminal is not capable of immersive media support. Multiple RTP streams may be included in the SDP offer.

3—The offered media is rejected by the Conference Room Terminal indicating that it has no support for immersive media. Instead, the Conference Room Terminal sends an SDP answer to the Conferencing Server indicating its 2D video capabilities. Multiple RTP streams may be included in the SDP answer depending on the capture capabilities of the conference room.

4—The Conferencing Server responds to the Remote Participant UE with an SDP answer confirming immersive media capabilities including 360 video support. Optionally, the Conference Room Terminal may also accept viewport-dependent processing capability in the SDP answer. In case viewport-dependent processing is accepted, the SDP answer from the Conference Room Terminal may include multiple RTP streams.

5—The Conference Room Terminal streams multiple RTP media flows carrying 2D video to the Conferencing Server.

6—The Conferencing Server stitches the received 2D videos to generate immersive media including 360 video and streams it to the Remote Participant UE. 360 video transmission could be based on the RTP payload formats for HEVC that carry SEI messages describing immersive media metadata as described herein.

7—(Optional) The Remote Participant UE signals the desired Viewport Information to the Conferencing Server using a dedicated RTCP feedback message, e.g., based on the potential solution described herein.

8—(Optional) The Conferencing Server streams the viewport-optimized RTP media flow with immersive media including 360 video to the Remote Participant UE. Information on the actually transmitted viewport may also be included in the RTP media flow, e.g., based on the potential solution described herein. In case two RTP streams are negotiated, then the viewport-optimized RTP stream containing the high quality 360 video may contain this information.

ADDITIONAL EMBODIMENTS OF THE DISCLOSURE

Network-based 360 video stitching is included in the Immersive Teleconferencing and Telepresence for Remote Terminals (ITT4RT) permanent document as a possible method to produce 360 video content to be delivered as part of immersive teleconferencing and telepresence sessions. Accordingly, different 2D captures are sent from the conference room to the conferencing server and the conferencing server performs decoding, stitching, and re-encoding to produce the immersive 360 degree video, which is then distributed to the remote participants. In this setting, different 2D captures are performed by different cameras (e.g., lenses) that may have been calibrated differently. Therefore, to help with the 360 video production at the conferencing server, there is a benefit in signaling the camera calibration parameters such that the 2D videos can properly be aligned prior to the 360 video production. In this contribution we provide background, requirements and potential solutions on the signaling of camera calibration parameters to facilitate network-based stitching in the ITT4RT framework.

Camera calibration is necessary for stitching, either network-based or on premise, on any 360 degree multi-lens cameras. When having network-based stitching solution, the stitching service on the cloud (or edge) need to get calibration parameters at beginning of the service session. This is necessary so that the multiple videos captured by an array of cameras can be aligned and stitched together into a perfectly uniform sphere, removing lens distortion and matching color and tone. The basic parameters include lens numbers, layouts, positions, angles, radius and resolutions.

Some example camera calibration parameters are illustrated in FIGS. 6-10.

Derived Requirements

To facilitate network-based stitching, it is possible to signal camera calibration parameters for each 2D video capture (e.g., each camera lens) transported from the conference room to the conferencing server at the beginning of each session. Relevant parameters include lens numbers, layouts, positions, angles, radius and resolutions.

Potential Solution Via SDP Signaling

Clause 4.5 of the framework for live uplink streaming (FLUS) specification in 3GPP TS 26.238 describes the FLUS source system. Accordingly the MTSI instantiation of FLUS supports SDP-based description of the relationships among multiple streams in a FLUS source system identified using the SDP attribute a=3gpp-flus-system: <urn>, and every media stream part of the FLUS source system indicated using SDP attribute "a=label:flus . . . ". Further details can be found in Table 4.5-1 of 3GPP TS 26.238, shown below for reference:

TABLE 4.5-1

| | | General source system description | |
|---|---|---|---|
| Source System | Description | IMS-based Instantiation SDP Parameters | Non-IMS-based Instantiation Parameters |
| Source System Identifier | A URI that uniquely identifies the source system | a=3gpp-flus-system:<urn> | JSON Object (SourceSystemIdentifier) |
| FLUS media stream to session mapping | Grouping description needed to identify the FLUS media streams when a FLUS session is part of an MTSI session | a=group:FLUS <mid_1> <mid_2>... | Not applicable |
| Configuration | Provides source system-specific configuration parameters for the source system. | a=3gpp-flus-configuration:<base 64 encoded> | Not applicable |

TABLE 4.5-1-continued

General source system description

| Source System | Description | IMS-based Instantiation SDP Parameters | Non-IMS-based Instantiation Parameters |
|---|---|---|---|
| Media Stream | Descriptions of the media streams that are defined by the source system | m= (one per stream) | Defined by the F-U instantiation |
| Identifier | A unique identifier shall be associated with every FLUS media stream. If not present, then the source system description should contain sufficient information to uniquely identify the media stream in the system. | a=label:flus...mid:<media_id> (RTP SSRC being the unique identifier, may be implicit if a=ssrc is not included) | Defined by the F-U instantiation (may be implicit) |
| Stream Configuration | Describes the details of the media stream, including the encoding, the metadata, etc. The media stream is self-describing in the system. The definition of a single media stream, in the context of session description information, is provided during session establishment, e.g. by a media line in SDP. | a=3gpp-flus-media-configuration:<base 64 encoded> | Defined by the F-U instantiation |
| Bandwidth Requirement | Indication of the required network bandwidth to transport the media streams of the source system. Mandatory if QoS is required | b=AS:<bw> a=bw-info: | Defined by the F-U instantiation |
| Transmission Direction | Optional indication of the transmission direction of the media streams | a=sendonly (mandatory) | Defined by the F-U instantiation |
| Codec | Codec Identifier | a=rtpmap: (mandatory) | Defined by F-U instantiation. |
| Codec configuration | Codec-specific configuration information for the set of media streams in the source system | a=fmtp: | Defined by F-U instantiation |
| Media Type | Media type of each media stream: audio, video, text, etc . . . | m=<type> (mandatory) | Defined by F-U instantiation |
| Media Transport and Control | Identification of the media transport protocol, operating over IP, for this media stream in the source system | m=<type> <port> RTP/AVP (mandatory) RTP/AVPF (if video rate adaptation is desired) | Defined by F-U instantiation. |

One potential solution is to adopt the FLUS signaling framework to provide the relationships among the 2D video captures to be used for network-based stitching in ITT4RT and amend the SDP-based signaling in Table 4.5-1 to also include the camera calibration parameters. The existing SDP syntax in Table 4.5-1 may be reused (e.g., a=3gpp-flus-configuration: which provides source system-specific configuration parameters for the source system) or a dedicated new SDP attribute (e.g., a=a=3gpp-flus-camera-configuration) may be defined to explicitly signal the camera calibration parameters for each media stream.

The set of camera calibration parameters to be signaled can include lens numbers, layouts, positions, angles, radius and resolutions. More specifically the following parameters may be signaled via SDP:

Number of cameras
Layout of the cameras

General intrinsic parameters: resolution, Focal length (focal_x, focal_y) in pixel unit (int), Principal point (center of projection), Lens distortion (deviation from ideal perspective or fisheye) of each camera Other intrinsic parameters for each camera (see, e.g., FIG. 7), such as image_height, image_width, center_x, center_y, radius in pixel unit (int) and camera field of view (fov_h, fov_v) in angle or radian degree unit (float)

Extrinsic camera parameters for each camera (see, e.g., FIG. 8), such as translation (x, y, z coordinates) and orientation (yaw, pitch, roll) values of each camera to accommodate various rig geometries.

Other extrinsic camera parameters for each camera represented by x, y, z coordinates and center_azimuth, center_elevation, center_tilt, azimuth_range, elevation_ range defined as below

| | | | |
|---|---|---|---|
| center_azimuth | Int: Range is $[-180*2^{-16}, 180*2^{-16}]$ | 1 | Specifies the azimuth of the centre point of the camera position in units of $2^{-16}$ degrees relative to the global coordinate axes. When not present, center_azimuth is inferred to be equal to 0. |

| | | | |
|---|---|---|---|
| center_elevation | Int: Range is $[-90* 2^{-16}, 90* 2^{-16}]$ | 1 | Specifies the elevation of the centre point of the camera position in units of $2^{-16}$ degrees relative to the global coordinate axes. When not present, center_elevation is inferred to be equal to 0. |
| center_tilt | Int: Range is $[-180* 2^{-16}, 180* 2^{-16}]$ | 1 | Specifies the tilt angle of the viewport position, in units of $2^{-16}$ degrees, relative to the global coordinate axes. When not present, center_tilt is inferred to be equal to 0. |
| azimuth_range | Int | 0.1 | Specifies the azimuth range of the sphere region through the centre point of the sphere region in units of $2^{-16}$ degrees. When not present, azimuth_range is inferred to be equal to $360 * 2^{16}$. Only relevant for 3D viewports |
| elevation_range | Int | 0.1 | Specifies the elevation range of the sphere region through the centre point of the sphere region in units of $2^{-16}$ degrees. When not present, elevation_range is inferred to be equal to $180 * 2^{16}$. Only relevant for 3D viewports |

In various embodiments, a new SDP attribute 3gpp_camera_calibration may be defined with the following augmented Backus-Naur form (ABNF):

3gpp_camera_calibration="a=3gpp_camera_calibration:" [SP "Param 1" SP "Param 2" SP SP "Param K"]

where "Param 1", . . . , "Param K" may be the set of intrinsic and extrinsic camera parameters.

In an alternative solution, intrinsic and extrinsic camera calibration parameters may be signaled as part of the Advance Video Coding (AVC) or HEVC bitstream in the SEI messages. In that case, the SDP attribute a=3gpp_camera_calibration may be a standalone attribute (without the parameters above) included as part of each media stream (under the m=line) and its presence in the SDP indicates that the AVC or HEVC bitstream carried as part of the corresponding RTP-based media stream contains SEI messages on camera calibration parameters. The corresponding SEI message syntax is shown below (from ISO/IEC 23008-2 for HEVC and ISO/IEC 14496-10 for AVC).

A media production system on the network side (e.g., FLUS sink) would receive a group of RTP streams carrying captured 2D AVC/HEVC video bitstreams each of which carries camera calibration parameters in SEI messages as per below, which are then to be parsed and used for stitching the 2D videos for 360 video production.

| | Descriptor |
|---|---|
| multiview_acquisition_info( payloadSize ) { | |
|   intrinsic_param_flag | u(1) |
|   extrinsic_param_flag | u(1) |
|   if( intrinsic_param_flag) { | |
|     intrinsic_params_equal_flag | u(1) |
|     prec_focal_length | ue(v) |
|     prec_principal_point | ue(v) |
|     prec_skew_factor | ue(v) |
|     for( i = 0; i <= intrinsic_params_equal_flag ? 0 : numViewsMinus1; i++ ) { | |
|       sign_focal_length_x[ i ] | u(1) |
|       exponent_focal_length_x[ i ] | u(6) |
|       mantissa_focal_length_x[ i ] | u(v) |
|       sign_focal_length_y[ i ] | u(1) |
|       exponent_focal_length_y[ i ] | u(6) |
|       mantissa_focal_length_y[ i ] | u(v) |
|       sign_principal_point_x[ i ] | u(1) |
|       exponent_principal_point_x[ i ] | u(6) |
|       mantissa_principal_point_x[ i ] | u(v) |
|       sign_principal_point_y[ i ] | u(1) |
|       exponent_principal_point_y[ i ] | u(6) |
|       mantissa_principal_point_y[ i ] | u(v) |
|       sign_skew_factor[ i ] | u(1) |
|       exponent_skew_factor[ i ] | u(6) |
|       mantissa_skew_factor[ i ] | u(v) |
|     } | |
|   } | |
|   if( extrinsic_param_flag ) { | |
|     prec_rotation_param | ue(v) |
|     prec_translation_param | ue(v) |
|     for( i = 0; i <= numViewsMinus1; i++ ) | |
|       for( j = 0; j < 3; j++ ) { /* row */ | |
|         for( k = 0; k < 3; k++ ) { /* column */ | |
|           sign_r[ i ][ j ][k] | u(1) |
|           exponent_r[ i ][ j ][ k ] | u(6) |
|           mantissa_r[ i ][ j ][ k ] | u(v) |
|         } | |
|         sign_t[ i ][ j ] | u(1) |
|         exponent_t[ i ][ j ] | u(6) |
|         mantissa_t[ i ][ j ] | u(v) |
|       } | |
|   } | |
| } | |

A.1.1.1 Multiview Acquisition Information SEI Message Semantics

The multiview acquisition information SEI message specifies various parameters of the acquisition environment. Specifically, intrinsic and extrinsic camera parameters are specified. These parameters could be used for processing the decoded views prior to rendering on a 3D display.

The following semantics apply separately to each nuh_layer_id targetLayerId among the nuh_layer_id values to which the multiview acquisition information SEI message applies as specified in D.3.1.

When present, the multiview acquisition information SEI message that applies to the current layer shall be included in an access unit that contains an TRAP picture that is the first picture of a CLVS of the current layer. The information signalled in the SEI message applies to the CLVS.

When the multiview acquisition information SEI message is included in a scalable nesting SEI message, the syntax elements bitstream_subset_flag, nesting_op_flag, and all_layers_flag in the scalable nesting SEI message shall be equal to 0.

The variable numViewsMinus1 is derived as follows:

If the multiview acquisition information SEI message is not included in a scalable nesting SEI message, numViewsMinus1 is set equal to 0.

Otherwise (the multiview acquisition information SEI message is included in a scalable nesting SEI message), numViewsMinus1 is set equal to nesting_num_layers_minus1.

Some of the views for which the multiview acquisition information is included in a multiview acquisition information SEI message may not be present.

In the semantics below, index i refers to the syntax elements and variables that apply to the layer with nuh_layer_id equal to nestingLayerIdList[0][i].

The extrinsic camera parameters are specified according to a right-handed coordinate system, where the upper left corner of the image is the origin, e.g. the (0, 0) coordinate, with the other corners of the image having non-negative coordinates. With these specifications, a 3-dimensional world point, wP=[x y z] is mapped to a 2-dimensional camera point, cP[i]=[u v 1], for the i-th camera according to:

$$s*cP[i]=A[i]*R^{-1}[i]*(wP-T[i])  \quad (G-11)$$

where A[i] denotes the intrinsic camera parameter matrix, $R^{-1}$[i] denotes the inverse of the rotation matrix R[i], T[i] denotes the translation vector, and s (a scalar value) is an arbitrary scale factor chosen to make the third coordinate of cP[i] equal to 1. The elements of A[i], R[i], T[i] are determined according to the syntax elements signalled in this SEI message and as specified below.

intrinsic_param_flag equal to 1 indicates the presence of intrinsic camera parameters. intrinsic_param_flag equal to 0 indicates the absence of intrinsic camera parameters.

extrinsic_param_flag equal to 1 indicates the presence of extrinsic camera parameters. extrinsic_param_flag equal to 0 indicates the absence of extrinsic camera parameters.

intrinsic_params_equal_flag equal to 1 indicates that the intrinsic camera parameters are equal for all cameras and only one set of intrinsic camera parameters are present. intrinsic_params_equal_flag equal to 0 indicates that the intrinsic camera parameters are different for each camera and that a set of intrinsic camera parameters are present for each camera.

prec_focal_length specifies the exponent of the maximum allowable truncation error for focal_length_x[i] and focal_length_y[i] as given by $2^{-prec\_focal\_length}$. The value of prec_focal_length shall be in the range of 0 to 31, inclusive.

prec_principal_point specifies the exponent of the maximum allowable truncation error for principal_point_x[i] and principal_point_y[ i ] as given by 2−prec_principal_point. The value of prec_principal_point shall be in the range of 0 to 31, inclusive.

prec_skew_factor specifies the exponent of the maximum allowable truncation error for skew factor as given by 2−prec_skew_factor. The value of prec_skew_factor shall be in the range of 0 to 31, inclusive.

sign_focal_length_x[i] equal to 0 indicates that the sign of the focal length of the i-th camera in the horizontal direction is positive. sign_focal_length_x[i] equal to 1 indicates that the sign is negative.

exponent_focal_length_x[i] specifies the exponent part of the focal length of the i-th camera in the horizontal direction. The value of exponent_focal_length_x[i] shall be in the range of 0 to 62, inclusive. The value 63 is reserved for future use by ITU-T|ISO/IEC. Decoders shall treat the value 63 as indicating an unspecified focal length.

mantissa_focal_length_x[i] specifies the mantissa part of the focal length of the i-th camera in the horizontal direction. The length of the mantissa_focal_length_x[i] syntax element is variable and determined as follows:

If exponent_focal_length_x[i] is equal to 0, the length is Max(0, prec_focal_length−30).

Otherwise (exponent_focal_length_x[i] is in the range of 0 to 63, exclusive), the length is Max(0, exponent_focal_length_x[i] +prec_focal_length−31).

sign_focal_length_y[i] equal to 0 indicates that the sign of the focal length of the i-th camera in the vertical direction is positive. sign_focal_length_y[i] equal to 1 indicates that the sign is negative.

exponent_focal_length_y[i] specifies the exponent part of the focal length of the i-th camera in the vertical direction. The value of exponent_focal_length_y[i] shall be in the range of 0 to 62, inclusive. The value 63 is reserved for future use by ITU-T|ISO/IEC. Decoders shall treat the value 63 as indicating an unspecified focal length.

mantissa_focal_length_y[i] specifies the mantissa part of the focal length of the i-th camera in the vertical direction. The length of the mantissa_focal_length_y[i] syntax element is variable and determined as follows:

If exponent_focal_length_y[i ] is equal to 0, the length is Max(0, prec_focal_length−30).

Otherwise (exponent_focal_length_y[i] is in the range of 0 to 63, exclusive), the length is Max(0, exponent_focal_length_y[i]+prec_focal_length−31).

sign_principal_point_x[i] equal to 0 indicates that the sign of the principal point of the i-th camera in the horizontal direction is positive. sign_principal_point_x[i] equal to 1 indicates that the sign is negative.

exponent_principal_point_x[i] specifies the exponent part of the principal point of the i-th camera in the horizontal direction. The value of exponent_principal_point_x[i] shall be in the range of 0 to 62, inclusive. The value 63 is reserved for future use by ITU-T|ISO/IEC. Decoders shall treat the value 63 as indicating an unspecified principal point.

mantissa_principal_point_x[i] specifies the mantissa part of the principal point of the i-th camera in the horizontal direction. The length of the mantissa_principal_point_x[i] syntax element in units of bits is variable and is determined as follows:

If exponent_principal_point_x[i] is equal to 0, the length is Max(0, prec_principal_point−30).

Otherwise (exponent_principal_point_x[i] is in the range of 0 to 63, exclusive), the length is Max(0, exponent_principal_point_x[i] +prec_principal_point−31).

sign_principal_point_y[i] equal to 0 indicates that the sign of the principal point of the i-th camera in the vertical direction is positive. sign_principal_point_y[i] equal to 1 indicates that the sign is negative.

exponent_principal_point_y[i] specifies the exponent part of the principal point of the i-th camera in the vertical direction. The value of exponent_principal_point_y[i] shall be in the range of 0 to 62, inclusive. The value 63 is reserved for future use by ITU-T|ISO/IEC. Decoders shall treat the value 63 as indicating an unspecified principal point.

mantissa_principal_point_y[i] specifies the mantissa part of the principal point of the i-th camera in the vertical direction. The length of the mantissa_principal_point_y[i] syntax element in units of bits is variable and is determined as follows:

If exponent_principal_point_y[i] is equal to 0, the length is Max(0, prec_principal_point−30).

Otherwise (exponent_principal_point_y[i] is in the range of 0 to 63, exclusive), the length is Max(0, exponent_principal_point_y[i]+prec_principal_point−31).

sign_skew_factor[i] equal to 0 indicates that the sign of the skew factor of the i-th camera is positive.

sign_skew_factor[i] equal to 1 indicates that the sign is negative.

exponent_skew_factor[i] specifies the exponent part of the skew factor of the i-th camera. The value of exponent_skew_factor[i] shall be in the range of 0 to 62, inclusive. The value 63 is reserved for future use by ITU-T|ISO/IEC. Decoders shall treat the value 63 as indicating an unspecified skew factor.

mantissa_skew_factor[i] specifies the mantissa part of the skew factor of the i-th camera. The length of the mantissa_skew_factor[i] syntax element is variable and determined as follows:

If exponent_skew_factor[i] is equal to 0, the length is Max(0, prec_skew_factor−30).

Otherwise (exponent_skew_factor[i] is in the range of 0 to 63, exclusive), the length is Max(0, exponent_skew_factor[i] +prec_skew_factor−31).

The intrinsic matrix A[i] for i-th camera is represented by:

$$\begin{bmatrix} focalLengthX[i] & skewFactor[i] & principalPointX[i] \\ 0 & focalLengthY[i] & principalPointY[i] \\ 0 & 0 & 1 \end{bmatrix} \quad (G-12)$$

prec_rotation_param specifies the exponent of the maximum allowable truncation error for r[i][j][k] as given by 2—prec_rotation_param. The value of prec_rotation_param shall be in the range of 0 to 31, inclusive.

prec_translation_param specifies the exponent of the maximum allowable truncation error for t[i][j] as given by 2—prec_translation_param. The value of prec_translation_param shall be in the range of 0 to 31, inclusive.

sign_r[i][j][k] equal to 0 indicates that the sign of (j, k) component of the rotation matrix for the i-th camera is positive. sign_r[i][j][k] equal to 1 indicates that the sign is negative.

exponent_r[i][j][k] specifies the exponent part of (j, k) component of the rotation matrix for the i-th camera. The value of exponent_r[i][j][k] shall be in the range of 0 to 62, inclusive. The value 63 is reserved for future use by ITU-T I ISO/IEC. Decoders shall treat the value 63 as indicating an unspecified rotation matrix.

mantissa_r[i][j][k] specifies the mantissa part of (j, k) component of the rotation matrix for the i-th camera. The length of the mantissa_r[i][j][k] syntax element in units of bits is variable and determined as follows:

If exponent_r[i] is equal to 0, the length is Max(0, prec_rotation_param−30).

Otherwise (exponent_r[i] is in the range of 0 to 63, exclusive), the length is Max(0, exponent_r[i]+prec_rotation_param−31).

The rotation matrix R[i] for i-th camera is represented as follows:

$$\begin{bmatrix} rE[i][0][0] & rE[i][0][1] & rE[i][0][2] \\ rE[i][1][0] & rE[i][1][1] & rE[i][1][2] \\ rE[i][2][0] & rE[i][2][1] & rE[i][2][2] \end{bmatrix} \quad (G-13)$$

sign_t[i][j] equal to 0 indicates that the sign of the j-th component of the translation vector for the i-th camera is positive. sign_t[i][j] equal to 1 indicates that the sign is negative.

exponent_t[i][j] specifies the exponent part of the j-th component of the translation vector for the i-th camera. The value of exponent_t[i][j] shall be in the range of 0 to 62, inclusive. The value 63 is reserved for future use by ITU-T|ISO/IEC. Decoders shall treat the value 63 as indicating an unspecified translation vector.

mantissa_t[i][j] specifies the mantissa part of the j-th component of the translation vector for the i-th camera. The length v of the mantissa_t[i][j] syntax element in units of bits is variable and is determined as follows:

If exponent_t[i] is equal to 0, the length v is set equal to Max(0, prec_translation_param−30).

Otherwise (0<exponent_t[i]<63), the length v is set equal to Max(0, exponent_t[i]+prec_translation_param−31).

The translation vector T[i] for the i-th camera is represented by:

$$\begin{bmatrix} tE[i][0] \\ tE[i][1] \\ tE[i][2] \end{bmatrix} \quad (G-14)$$

The association between the camera parameter variables and corresponding syntax elements is specified by Table G.5. Each component of the intrinsic and rotation matrices and the translation vector is obtained from the variables specified in Table G.5 as the variable x computed as follows:

If e is in the range of 0 to 63, exclusive, x is set equal to $(-1)s*2e-31*(1+n\div 2v)$.

Otherwise (e is equal to 0), x is set equal to $(-1)^{s}*2^{-(30+v)}*n$.

TABLE G.5

Association between camera parameter variables and syntax elements.

| X | s | E | n |
|---|---|---|---|
| focalLengthX[ i ] | sign_focal_length_x[ i ] | exponent_focal_length_x[ i ] | mantissa_focal_length_x[ i ] |
| focalLengthY[ i ] | sign_focal_length_y[ i ] | exponent_focal_length_y[ i ] | mantissa_focal_length_y[ i ] |
| principalPointX[ i ] | sign_principal_point_x[ i ] | exponent_principal_point_x[ i ] | mantissa_principal_point_x[ i ] |
| principalPointY[ i ] | sign_principal_point_y[ i ] | exponent_principal_point_y[ i ] | mantissa_principal_point_y[ i ] |
| skewFactor[ i ] | sign_skew_factor[ i ] | exponent_skew_factor[ i ] | mantissa_skew_factor[ i ] |
| rE[ i ][ j ][ k ] | sign_r[ i ][ j ][ k ] | exponent_r[ i ][ j ][ k ] | mantissa_r[ i ][ j ][ k ] |
| tE[ i ][ j ] | sign_t[ i ][ j ] | exponent_t[ i ][ j ] | mantissa_t[ i ][ j ] |

A.1.1.2 Multiview View Position SEI Message Semantics

Figure 9:
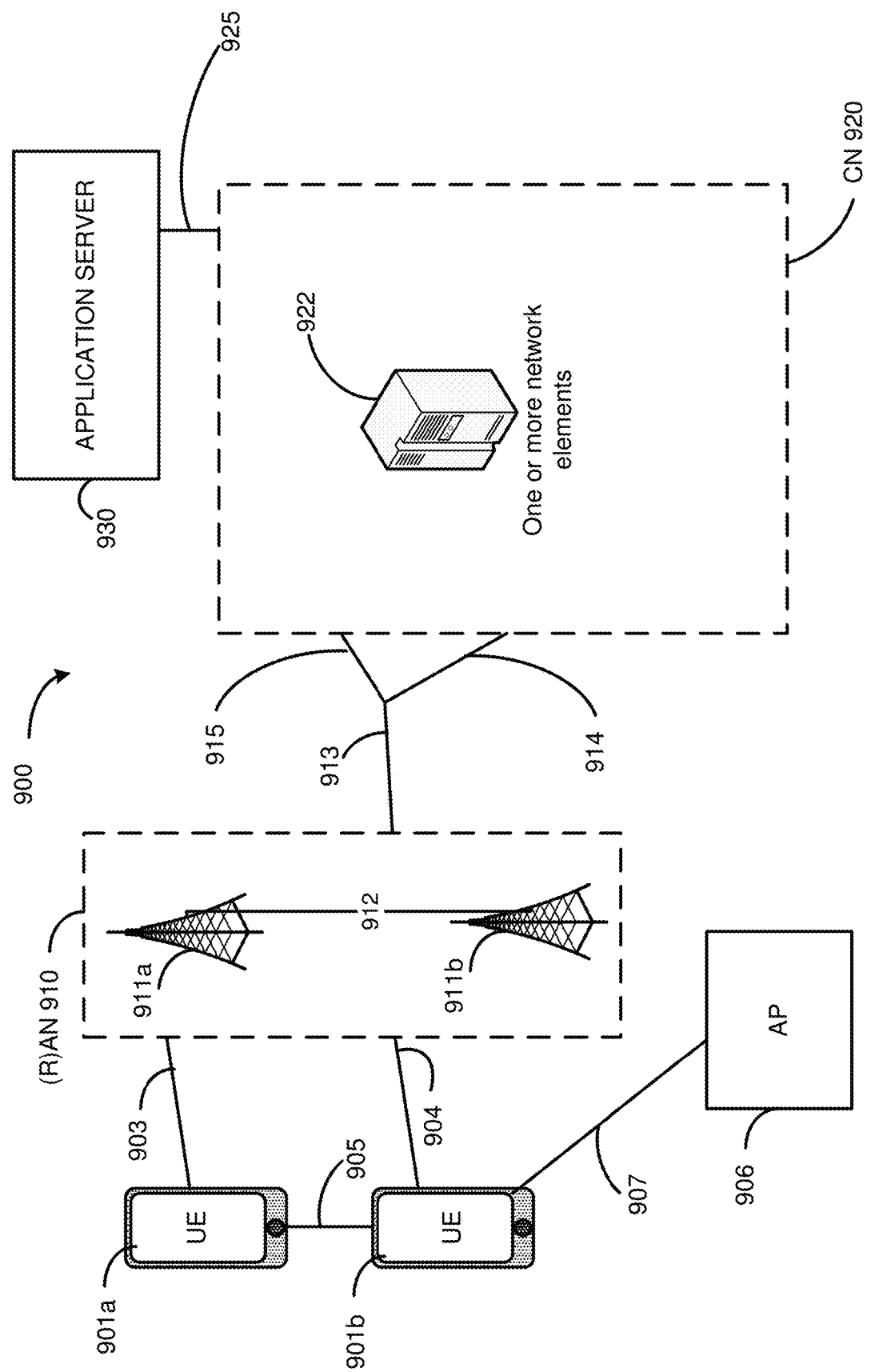
FIG. 9 illustrates an example architecture of a system of a network, in accordance with various embodiments.

The multiview view position SEI message specifies the relative view position along a single horizontal axis of views within a CVS. When present, the multiview view position SEI message shall be associated with an TRAP access unit. The information signalled in this SEI message applies to the entire CVS.

num_views_minus1 plus 1 shall be equal to NumViews derived from the active VPS for the CVS. The value of num_views_minus1 shall be in the range of 0 to 62, inclusive.

view_position[i] indicates the order of the view with ViewOrderIdx equal to i among all the views from left to right for the purpose of display, with the order for the left-most view being equal to 0 and the value of the order increasing by 1 for next view from left to right. The value of view_position[i] shall be in the range of 0 to 62, inclusive.
Systems and Implementations FIG. 9 illustrates an example architecture of a system 900 of a network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 901a and UE 901b (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with an or RAN 910. In embodiments, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901b is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 802.11 protocol, wherein the AP 906 would comprise a wireless fidelity (Wi-Fi®) router. In this example, the AP 906 is shown to be connected to the Internet without connecting to the core network of the wireless system (described in further detail below). In various embodiments, the UE 901b, RAN 910, and AP 906 may be configured to utilize LWA operation and/or LWIP operation. The LWA operation may involve the UE 901b in RRC_CONNECTED being configured by a RAN node 911a-b to utilize radio resources of LTE and WLAN. LWIP operation may involve the UE 901b using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911a and 911b (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various embodiments, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 911 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 911; a MAC/PHY split wherein RRC, PDCP, RLC, and MAC layers are operated by the CRAN/vBBUP and the PHY layer is operated by individual RAN nodes 911; or a "lower PHY" split wherein RRC, PDCP, RLC, MAC layers and upper portions of the PHY layer are operated by the CRAN/vBBUP and lower portions of the PHY layer are operated by individual RAN nodes 911. This virtualized framework allows the freed-up processor cores of the RAN nodes 911 to perform other virtualized applications. In some implementations, an individual RAN node 911 may represent individual gNB-DUs that are connected to a gNB-CU via individual F1 interfaces (not shown by FIG. 9). In these implementations, the gNB-DUs may include one or more remote radio heads or RFEMs (see, e.g., FIG. 10), and the gNB-CU may be operated by a server that is located in the RAN 910 (not shown) or by a server pool in a similar manner as the CRAN/vBBUP. Additionally or alternatively, one or more of the RAN nodes 911 may be next generation eNBs (ng-eNBs), which are RAN nodes that provide E-UTRA user plane and control plane protocol terminations toward the UEs 901, and are connected to a 5GC via an NG interface (discussed infra).

In V2X scenarios one or more of the RAN nodes 911 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 901 (vUEs 901). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 911 can terminate the air interface protocol and can be the first point of contact for the UEs 901. In some embodiments, any of the RAN nodes 911 can fulfill various logical functions for the RAN 910 including, but not limited to, radio network controller (RNC) functions such as radio bearer management, uplink and downlink dynamic radio resource management and data packet scheduling, and mobility management.

In embodiments, the UEs 901 can be configured to communicate using OFDM communication signals with each other or with any of the RAN nodes 911 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 to the UEs 901, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901b within a cell) may be performed at any of the RAN nodes 911 based on channel quality information fed back from any of the UEs 901. The downlink resource assignment information may be sent on the PDCCH used for (e.g., assigned to) each of the UEs 901.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 911 may be configured to communicate with one another via interface 912. In embodiments where the system 900 is an LTE system (e.g., when CN 920 is an EPC), the interface 912 may be an X2 interface 912. The X2 interface may be defined between two or more RAN nodes 911 (e.g., two or more eNBs and the like) that connect to EPC 920, and/or between two eNBs connecting to EPC 920. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 901 from an SeNB for user data; information of PDCP PDUs that were not delivered to a UE 901; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 900 is a 5G or NR system (e.g., when CN 920 is a 5GC), the interface 912 may be an Xn interface 912. The Xn interface is defined between two or more RAN nodes 911 (e.g., two or more gNBs and the like) that connect to 5GC 920, between a RAN node 911 (e.g., a gNB) connecting to 5GC 920 and an eNB, and/or between two eNBs connecting to 5GC 920. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 901 in a connected mode (e.g., CM-CONNECTED) including functionality to manage the UE mobility for connected mode between one or more RAN nodes 911. The mobility support may include context transfer from an old (source) serving RAN node 911 to new (target) serving RAN node 911; and control of user plane tunnels between old (source) serving RAN node 911 to new (target) serving RAN node 911. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 910 is shown to be communicatively coupled to a core network—in this embodiment, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 930 may be an element offering applications that use IP bearer resources with the core network (e.g., UMTS PS domain, LTE PS data services, etc.). The application server 930 can also be configured to support one or more communication services (e.g., VoIP sessions, PTT sessions, group communication sessions, social networking services, etc.) for the UEs 901 via the EPC 920.

In embodiments, the CN 920 may be a 5GC (referred to as "5GC 920" or the like), and the RAN 910 may be connected with the CN 920 via an NG interface 913. In embodiments, the NG interface 913 may be split into two parts, an NG user plane (NG-U) interface 914, which carries traffic data between the RAN nodes 911 and a UPF, and the S1 control plane (NG-C) interface 915, which is a signaling interface between the RAN nodes 911 and AMFs.

In embodiments, the CN 920 may be a 5G CN (referred to as "5GC 920" or the like), while in other embodiments, the CN 920 may be an EPC). Where CN 920 is an EPC (referred to as "EPC 920" or the like), the RAN 910 may be connected with the CN 920 via an S1 interface 913. In embodiments, the S1 interface 913 may be split into two parts, an S1 user plane (S1-U) interface 914, which carries traffic data between the RAN nodes 911 and the S-GW, and the S1-MME interface 915, which is a signaling interface between the RAN nodes 911 and MMEs.

Figure 10:
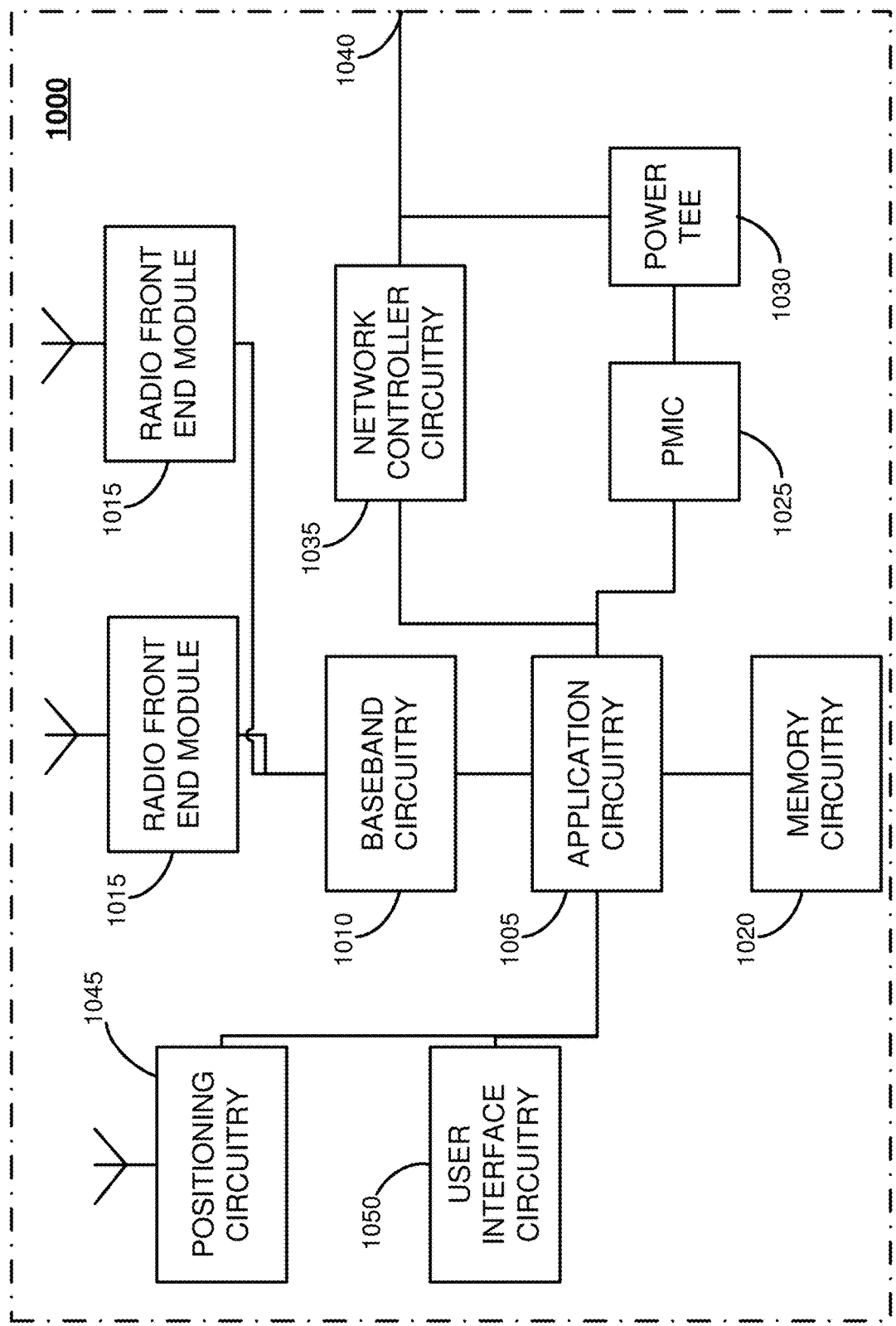
FIG. 10 illustrates an example of infrastructure equipment in accordance with various embodiments.

FIG. 10 illustrates an example of infrastructure equipment 1000 in accordance with various embodiments. The infrastructure equipment 1000 (or "system 1000") may be implemented as a base station, radio head, RAN node such as the RAN nodes 911 and/or AP 906 shown and described previously, application server(s) 930, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some embodiments, the device 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or SGC, for example.

In some implementations, the application circuitry 1005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 12.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1020 may be implemented as one or more of solder down packaged integrated circuits, socketed memory modules and plug-in memory cards.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the baseband circuitry 1010 and/or RFEMs 1015 to communicate with the nodes and components of the positioning network. The positioning circuitry 1045 may also provide position data and/or time data to the application circuitry 1005, which may use the data to synchronize operations with various infrastructure (e.g., RAN nodes 911, etc.), or the like.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 11:
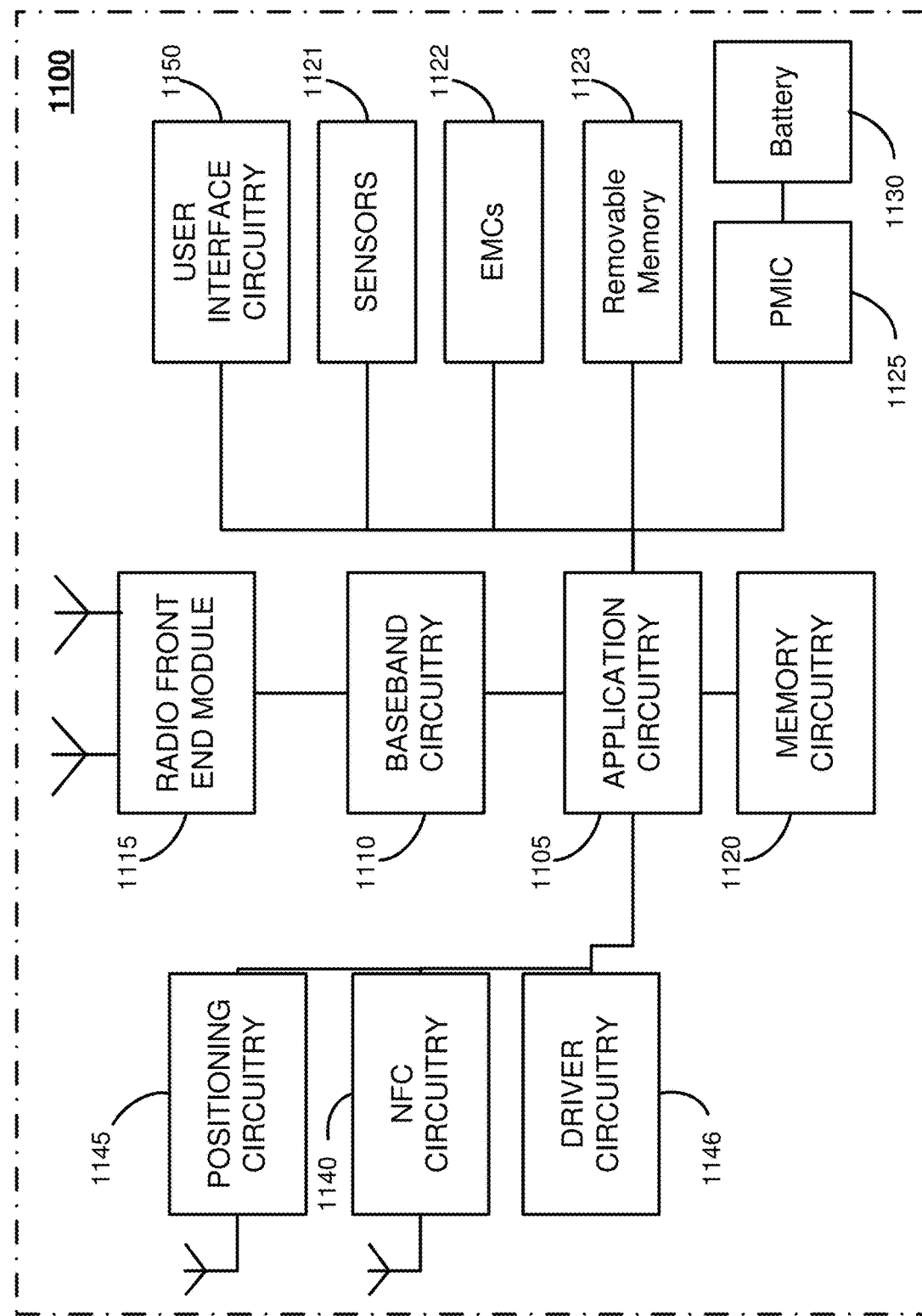
FIG. 11 illustrates an example of a computer platform in accordance with various embodiments.

FIG. 11 illustrates an example of a platform 1100 (or "device 1100") in accordance with various embodiments. In embodiments, the computer platform 1100 may be suitable for use as UEs 901, application servers 930, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1005 may comprise, or may be, a special-purpose processor/controller to operate according to the various embodiments herein.

As examples, the processor(s) of application circuitry 1105 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 1105 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package, such as the Edison™ or Galileo™ SoC boards from Intel® Corporation.

Additionally or alternatively, application circuitry 1105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric, and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1110 are discussed infra with regard to FIG. 12.

The RFEMs 1115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 may include any number and type of memory devices used to provide for a given amount of system memory. As examples, the memory circuitry 1120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1120 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1120 may be on-die memory or registers associated with the application circuitry 1105. To provide for persistent storage of information such as data, applications, operating systems and so forth, memory circuitry 1120 may include one or more mass storage devices, which may include, inter alia, a solid state disk drive (SSDD), hard disk drive (HDD), a micro HDD, resistance change memories, phase change memories, holographic memories, or chemical memories, among others.

For example, the computer platform 1100 may incorporate the three-dimensional (3D) cross-point (XPOINT) memories from Intel® and Micron®.

Removable memory circuitry 1123 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

The sensor circuitry 1121 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1122 include devices, modules, or subsystems whose purpose is to enable platform 1100 to change its state, position, and/or orientation, or move or control a mechanism or (sub)system. Additionally, EMCs 1122 may be configured to generate and send messages/signalling to other components of the platform 1100 to indicate a current state of the EMCs 1122. Examples of the EMCs 1122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1122 based on one or more captured events and/or instructions or control signals received from a service provider and/or various clients.

In some implementations, the interface circuitry may connect the platform 1100 with positioning circuitry 1145. The positioning circuitry 1145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1145 may include a Micro-PNT IC that uses a master timing clock to perform position tracking/estimation without GNSS assistance. The positioning circuitry 1145 may also be part of, or interact with, the baseband circuitry 1010 and/or RFEMs 1115 to communicate with the nodes and components of the positioning network. The positioning circuitry 1145 may also provide position data and/or time data to the application circuitry 1105, which may use the data to synchronize operations with various infrastructure (e.g., radio base stations), for turn-by-turn navigation applications, or the like In some implementations, the interface circuitry may connect the platform 1100 with Near-Field Communication (NFC) circuitry 1140. NFC circuitry 1140 is configured to provide contactless, short-range communications based on radio frequency identification (RFID) standards, wherein magnetic field induction is used to enable communication between NFC circuitry 1140 and NFC-enabled devices external to the platform 1100 (e.g., an "NFC touchpoint"). NFC circuitry 1140 comprises an NFC controller coupled with an antenna element and a processor coupled with the NFC controller. The NFC controller may be a chip/IC providing NFC functionalities to the NFC circuitry 1140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1140, or initiate data transfer between the NFC circuitry 1140 and another active NFC device (e.g., a smartphone or an NFC-enabled POS terminal) that is proximate to the platform 1100.

The driver circuitry 1146 may include software and hardware elements that operate to control particular devices that are embedded in the platform 1100, attached to the platform 1100, or otherwise communicatively coupled with the platform 1100. The driver circuitry 1146 may include individual drivers allowing other components of the platform 1100 to interact with or control various input/output (I/O) devices that may be present within, or connected to, the platform 1100. For example, driver circuitry 1146 may include a display driver to control and allow access to a display device, a touchscreen driver to control and allow access to a touchscreen interface of the platform 1100, sensor drivers to obtain sensor readings of sensor circuitry 1121 and control and allow access to sensor circuitry 1121, EMC drivers to obtain actuator positions of the EMCs 1122 and/or control and allow access to the EMCs 1122, a camera driver to control and allow access to an embedded image capture device, audio drivers to control and allow access to one or more audio devices.

The power management integrated circuitry (PMIC) 1125 (also referred to as "power management circuitry 1125") may manage power provided to various components of the platform 1100. In particular, with respect to the baseband circuitry 1110, the PMIC 1125 may control power-source selection, voltage scaling, battery charging, or DC-to-DC conversion. The PMIC 1125 may often be included when the platform 1100 is capable of being powered by a battery 1130, for example, when the device is included in a UE 901.

In some embodiments, the PMIC 1125 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

In some implementations, the battery 1130 may be a "smart battery," which includes or is coupled with a Battery Management System (BMS) or battery monitoring integrated circuitry. The BMS may be included in the platform 1100 to track the state of charge (SoCh) of the battery 1130. The BMS may be used to monitor other parameters of the battery 1130 to provide failure predictions, such as the state of health (SoH) and the state of function (SoF) of the battery 1130. The BMS may communicate the information of the battery 1130 to the application circuitry 1105 or other components of the platform 1100. The BMS may also include an analog-to-digital (ADC) convertor that allows the application circuitry 1105 to directly monitor the voltage of the battery 1130 or the current flow from the battery 1130. The battery parameters may be used to determine actions that the platform 1100 may perform, such as transmission frequency, network operation, sensing frequency, and the like.

A power block, or other power supply coupled to an electrical grid may be coupled with the BMS to charge the battery 1130. In some examples, the power block XS30 may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1150 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensor circuitry 1121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 12:
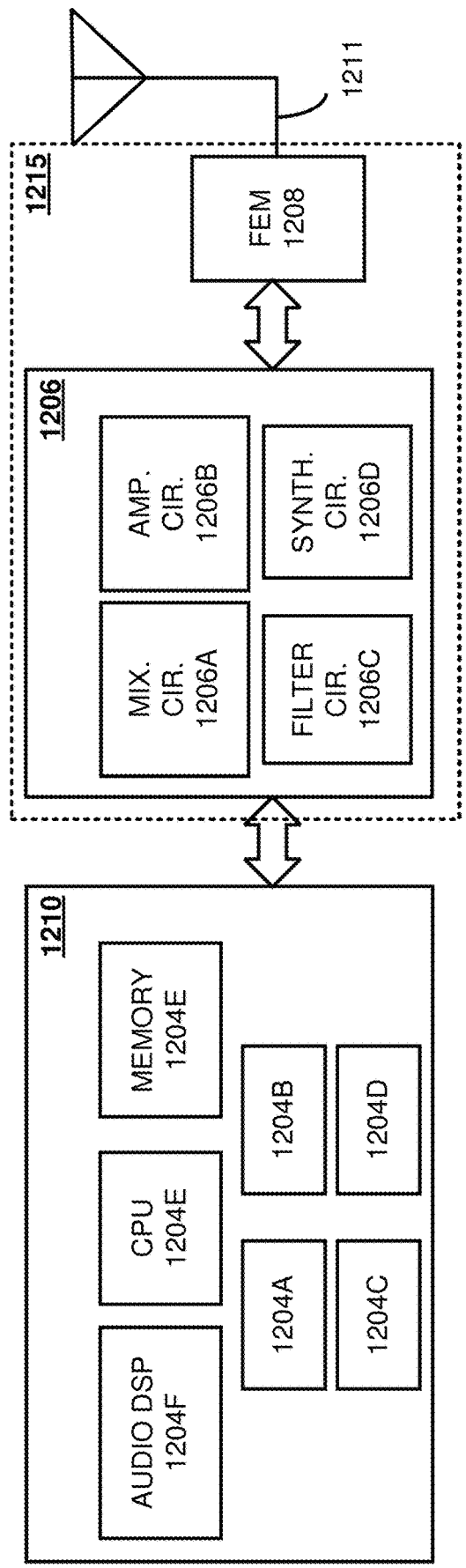
FIG. 12 illustrates example components of baseband circuitry and radio front end modules in accordance with various embodiments.

FIG. 12 illustrates example components of baseband circuitry 1210 and radio front end modules (RFEM) 1215 in accordance with various embodiments. The baseband circuitry 1210 corresponds to the baseband circuitry 1010 and 1110 of FIGS. 10 and 11, respectively. The RFEM 1215 corresponds to the RFEM 1015 and 1115 of FIGS. 10 and 11, respectively. As shown, the RFEMs 1215 may include Radio Frequency (RF) circuitry 1206, front-end module (FEM) circuitry 1208, antenna array 1211 coupled together at least as shown.

The baseband circuitry 1210 includes circuitry and/or control logic configured to carry out various radio/network protocol and radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1210 may include Fast-Fourier Transform (FFT), precoding, or constellation mapping/demapping functionality. In some embodiments, encoding/decoding circuitry of the baseband circuitry 1210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1210 is configured to process baseband signals received from a receive signal path of the RF circuitry 1206 and to generate baseband signals for a transmit signal path of the RF circuitry 1206. The baseband circuitry 1210 is configured to interface with application circuitry 1005/1105 (see FIGS. 10 and 11) for generation and processing of the baseband signals and for controlling operations of the RF circuitry 1206. The baseband circuitry 1210 may handle various radio control functions.

The aforementioned circuitry and/or control logic of the baseband circuitry 1210 may include one or more single or multi-core processors. For example, the one or more processors may include a 3G baseband processor 1204A, a 4G/LTE baseband processor 1204B, a 5G/NR baseband processor 1204C, or some other baseband processor(s) 1204D for other existing generations, generations in development or to be developed in the future (e.g., sixth generation (6G), etc.). In other embodiments, some or all of the functionality of baseband processors 1204A-D may be included in modules stored in the memory 1204G and executed via a Central Processing Unit (CPU) 1204E. In other embodiments, some or all of the functionality of baseband processors 1204A-D may be provided as hardware accelerators (e.g., FPGAs, ASICs, etc.) loaded with the appropriate bit streams or logic blocks stored in respective memory cells. In various embodiments, the memory 1204G may store program code of a real-time OS (RTOS), which when executed by the CPU 1204E (or other baseband processor), is to cause the CPU 1204E (or other baseband processor) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1210 includes one or more audio digital signal processor(s) (DSP) 1204F. The audio DSP(s) 1204F include elements for compression/decompression and echo cancellation and may include other suitable processing elements in other embodiments.

In some embodiments, each of the processors 1204A-1204E include respective memory interfaces to send/receive data to/from the memory 1204G. The baseband circuitry 1210 may further include one or more interfaces to communicatively couple to other circuitries/devices, such as an interface to send/receive data to/from memory external to the baseband circuitry 1210; an application circuitry interface to send/receive data to/from the application circuitry 1005/1105 of FIGS. 10-12); an RF circuitry interface to send/receive data to/from RF circuitry 1206 of FIG. 12; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1125.

In alternate embodiments (which may be combined with the above described embodiments), baseband circuitry 1210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (e.g., the radio front end modules 1215).

Although not shown by FIG. 12, in some embodiments, the baseband circuitry 1210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1210 and/or RF circuitry 1206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1210 and/or RF circuitry 1206 are part of a Wi-Fi communication system. In the second example, the protocol processing circuitry would operate Wi-Fi MAC and logical link control (LLC) functions. The protocol processing circuitry may include one or more memory structures (e.g., 1204G) to store program code and data for operating the protocol functions, as well as one or more processing cores to execute the program code and perform various operations using the data. The baseband circuitry 1210 may also support radio communications for more than one wireless protocol.

The various hardware elements of the baseband circuitry 1210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1210 may be suitably combined in a single chip or chipset, or disposed on a same circuit board. In another example, some or all of the constituent components of the baseband circuitry 1210 and RF circuitry 1206 may be implemented together such as, for example, a system on a chip (SoC) or System-in-Package (SiP). In another example, some or all of the constituent components of the baseband circuitry 1210 may be implemented as a separate SoC that is communicatively coupled with and RF circuitry 1206 (or multiple instances of RF circuitry 1206). In yet another example, some or all of the constituent components of the baseband circuitry 1210 and the application circuitry 1005/

1105 may be implemented together as individual SoCs mounted to a same circuit board (e.g., a "multi-chip package").

In some embodiments, the baseband circuitry 1210 may provide for communication compatible with one or more radio technologies. For example, in some embodiments, the baseband circuitry 1210 may support communication with an E-UTRAN or other WMAN, a WLAN, a WPAN. Embodiments in which the baseband circuitry 1210 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path, which may include circuitry to down-convert RF signals received from the FEM circuitry 1208 and provide baseband signals to the baseband circuitry 1210. RF circuitry 1206 may also include a transmit signal path, which may include circuitry to up-convert baseband signals provided by the baseband circuitry 1210 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1210 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1210 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a of the transmit signal path may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1210 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1210 or the application circuitry 1005/1105 depending on the desired output frequency. In some embodiments, a divider control input (e.g., N) may be determined from a look-up table based on a channel indicated by the application circuitry 1005/1105.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path, which may include circuitry configured to operate on RF signals received from antenna array 1211, amplify the received signals and provide the amplified versions of the received signals to the RF circuitry 1206 for further processing. FEM circuitry 1208 may also include a transmit signal path, which may include circuitry configured to amplify signals for transmission provided by the RF circuitry 1206 for transmission by one or more of antenna elements of antenna array 1211. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission by one or more antenna elements of the antenna array 1211.

The antenna array 1211 comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array 1211 including one or more antenna elements (not shown). The antenna elements may be omnidirectional, direction, or a combination thereof. The antenna elements may be formed in a multitude of arranges as are known and/or discussed herein. The antenna array 1211 may comprise microstrip antennas or printed antennas that are fabricated on the surface of one or more printed circuit boards. The antenna array 1211 may be formed in as a patch of metal foil (e.g., a patch antenna) in a variety of shapes, and may be coupled with the RF circuitry 1206 and/or FEM circuitry 1208 using metal transmission lines or the like.

Processors of the application circuitry 1005/1105 and processors of the baseband circuitry 1210 may be used to execute elements of one or more instances of a protocol stack. For example, processors of the baseband circuitry 1210, alone or in combination, may be used execute Layer 3, Layer 2, or Layer 1 functionality, while processors of the application circuitry 1005/1105 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 13:
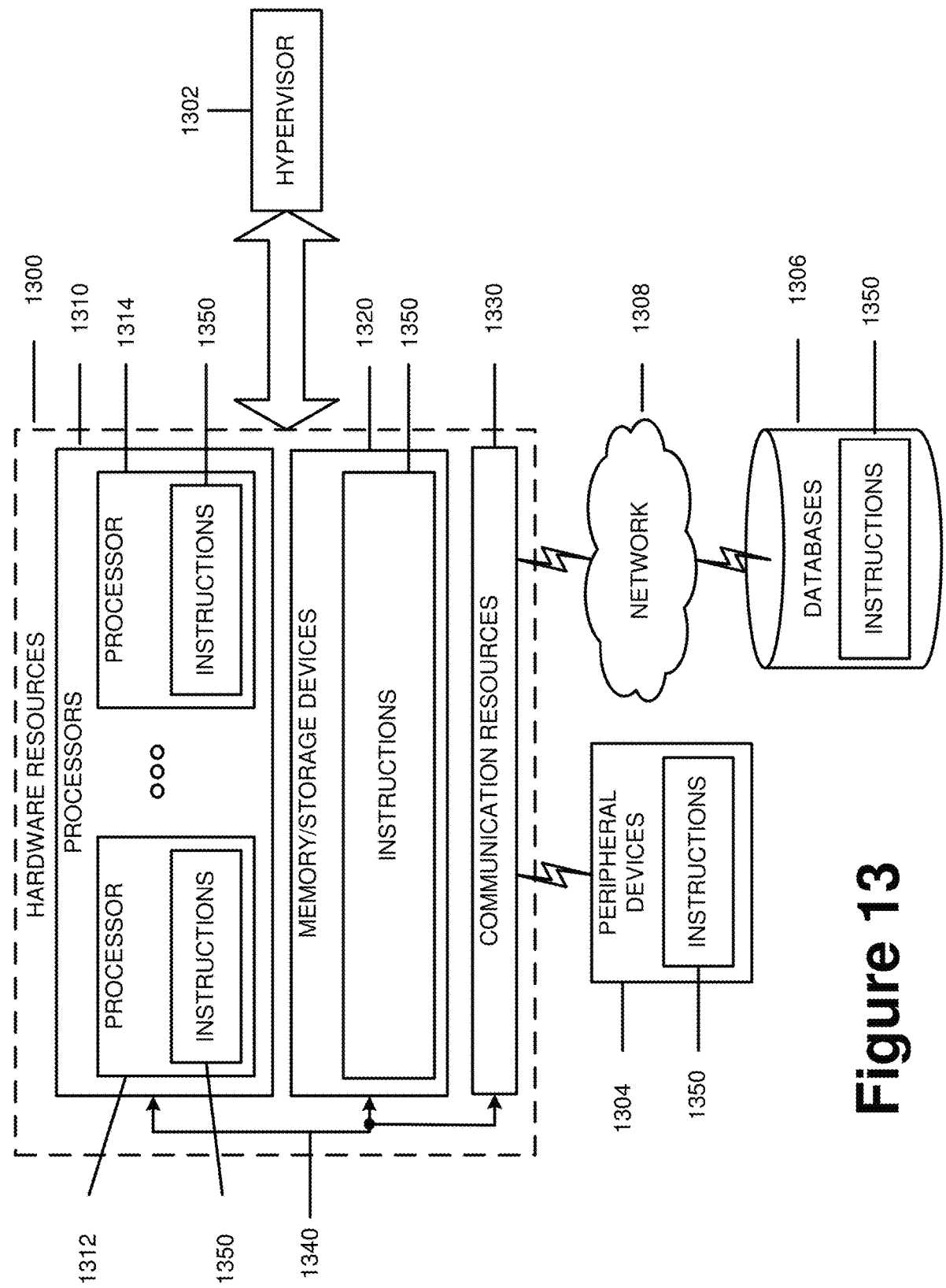
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processor(s) 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via USB), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

Example Procedures

Figure 14:
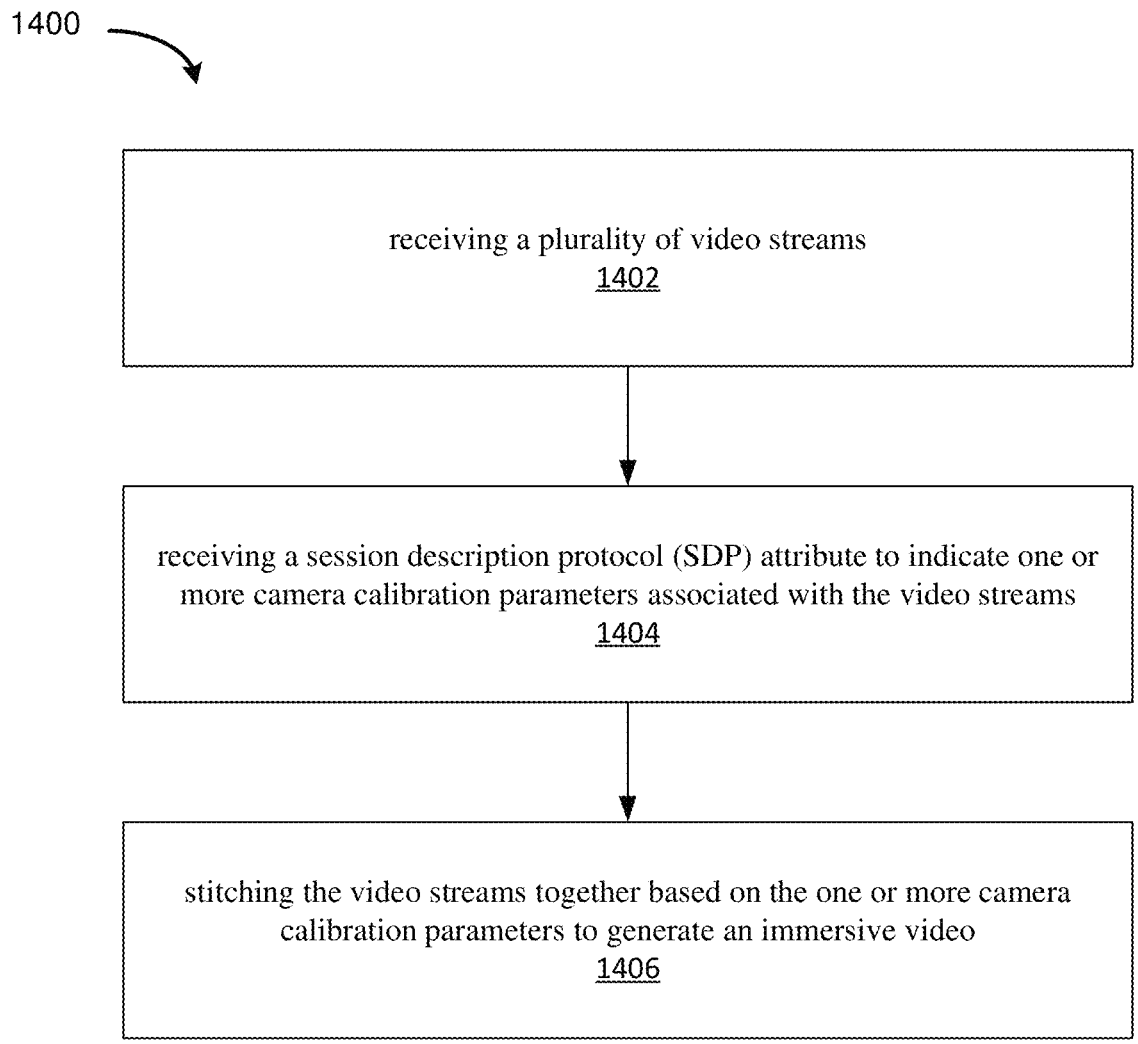
FIG. 14 is a flowchart of a process in accordance with various embodiments.

In some embodiments, the electronic device(s), network(s), system(s), chip(s) or component(s), or portions or implementations thereof, of FIGS. 9-13, or some other figure herein, may be configured to perform one or more processes, techniques, or methods as described herein, or portions thereof. One such process 1400 is depicted in FIG. 14. For example, the process 1400 may include, at 1402, receiving a plurality of video streams. At 1404, the process 1400 may further include receiving a session description protocol (SDP) attribute to indicate one or more camera calibration parameters associated with the video streams. At 1406, the process 1400 may further include stitching the video streams together based on the one or more camera calibration parameters to generate an immersive video.

In some embodiments, the process 1400 may further include rendering and/or displaying the immersive video. The process 1400 may be performed by any suitable device, such as teleconferencing system or a portion thereof.

Figure 15:
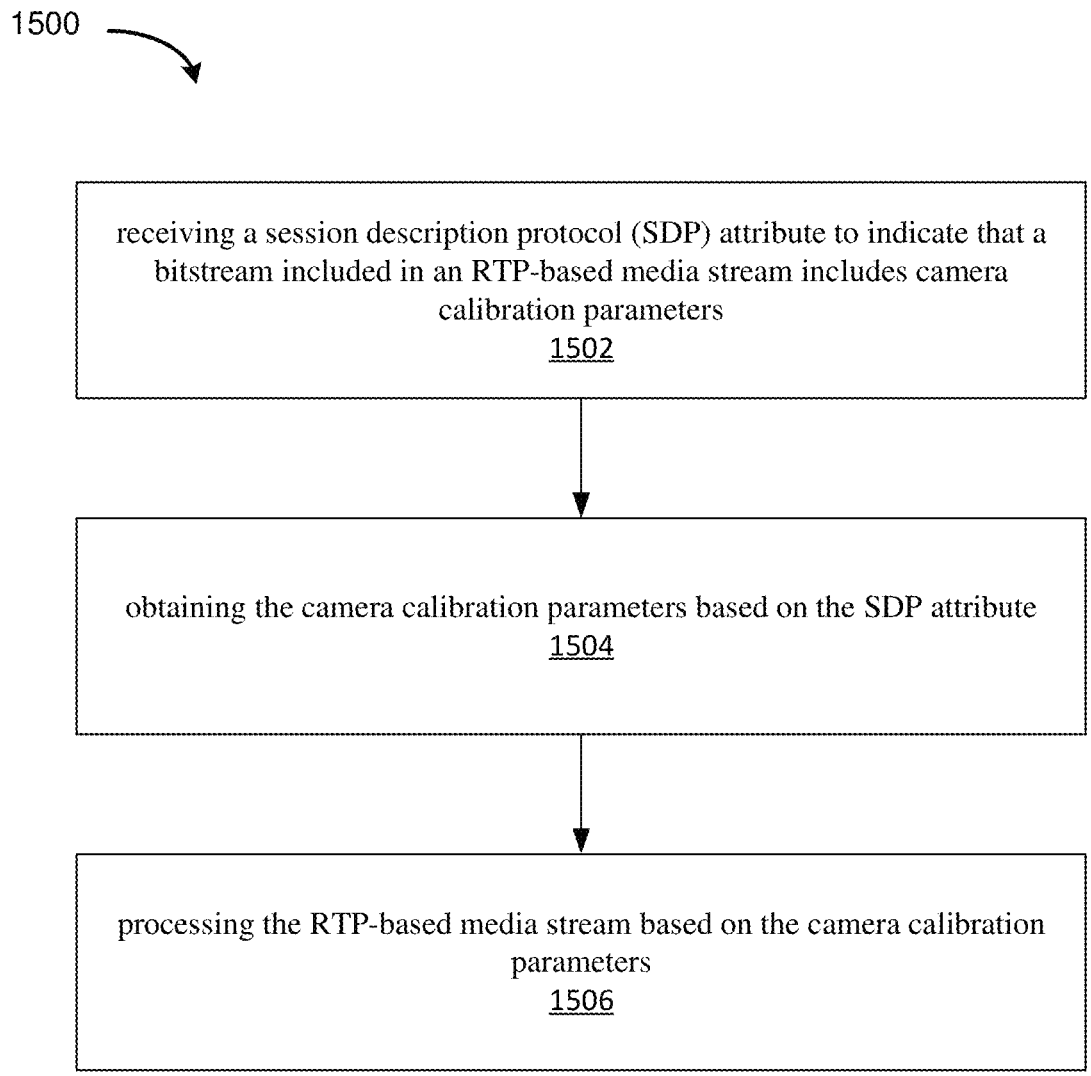
FIG. 15 is a flowchart of another process in accordance with various embodiments.

FIG. 15 illustrates another process 1500 in accordance with various embodiments. In embodiments, the process 1500 may include, at 1502, receiving a session description protocol (SDP) attribute to indicate that a bitstream included in an RTP-based media stream includes camera calibration parameters. In embodiments, the bitstream may include a AVC and/or HEVC bitstream.

At 1504, the process 1500 may further include obtaining the camera calibration parameters based on the SDP attribute. In some embodiments, the camera calibration parameters may be included in one or more SEI messages in the bitstream. The camera calibration parameters may include, for example, one or more of: number of cameras, angles, radius, resolutions, layouts and positions (e.g., relative position represented by X,Y,Z translation and rotation from the rig center); intrinsic parameters of each camera including one or more of: Field of View, principal point (center of projection), image and angular pixel resolution, lens distortion (deviation from ideal perspective or fisheye), image_height, image_width, center_x, center_y, and/or radius; and/or extrinsic parameters of each camera including one or more of: rotation angle (e.g., yaw, pitch, roll) and translation (X, Y, Z coordinates), center_azimuth, center_elevation, center_tilt, azimuth_range, and/or elevation_range.

At 1506, the process 1500 may further include processing the RTP-based media stream based on the camera calibration parameters.

The process 1500 may be performed by any suitable device, such as a media production system. In some embodiments, the media production system may be a teleconferencing system.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the new SDP attribute to indicate camera calibration parameters for a group of RTP streams carrying captured 2D videos, which is then to be used for stitching the 2D videos for 360 video production Example 2 may include the SDP attribute of example 1 or some other example herein, where the camera calibration parameters include one or more of the following: number of cameras, angles, radius and resolutions, layouts and positions to accommodate various rig geometries (e.g., relative position represented by X,Y,Z translation and rotation from the rig center): a). intrinsic parameters of each camera: Field of View, principal point (center of projection), image and angular pixel resolution, lens distortion (deviation from ideal perspective or fisheye), and image_height, image_width, center_x, center_y, radius described in above intrinsic figure; b). extrinsic parameters of each camera: rotation angle (e.g., yaw, pitch, roll) and translation(X, Y, Z coordinates) presented in the extrinsic parameters figure, and center_azimuth, center_elevation, center_tilt, azimuth_range and elevation_range presented below the extrinsic parameters figure.

Example 3 may include the SDP attribute of example 2 or some other example herein, where the SDP attribute is declared for each media stream and expresses the camera calibration parameters on a per-stream basis.

Example 4 may include the new SDP media-level attribute to indicate the presence of camera calibration parameters for a given AVC or HEVC bitstream carried as part of the corresponding RTP-based media stream.

Example 5 may include the SDP attribute of example 4 or some other example herein, where the camera calibration parameters include one or more of the following: number of cameras, angles, radius and resolutions, layouts and positions to accommodate various rig geometries (e.g., relative position represented by X,Y,Z translation and rotation from the rig center): a). intrinsic parameters of each camera: Field of View, principal point (center of projection), image and angular pixel resolution, lens distortion (deviation from ideal perspective or fisheye), and image_height, image_width, center_x, center_y, radius described in above intrinsic figure; b). extrinsic parameters of each camera: rotation angle (e.g., yaw, pitch, roll) and translation (X, Y, Z coordinates) presented in the extrinsic parameters figure, and center_azimuth, center_elevation, center_tilt, azimuth_range and elevation_range presented below the extrinsic parameters figure.

Example 6 may include the SDP attribute of example 4 or some other example herein, where the camera calibration parameters are carried as part of the Multiview acquisition information SEI message for an AVC bitstream as per ISO/IEC 14496-10.

Example 7 may include the SDP attribute of example 4 or some other example herein, where the camera calibration parameters are carried as part of the Multiview acquisition information SEI message for an HEVC bitstream as per ISO/IEC 23008-2.

Example 8 may include the media production system receiving a group of RTP streams carrying captured 2D AVC/HEVC video bitstreams each of which carries camera calibration parameters in SEI messages, which are then to be parsed and used for stitching the 2D videos for 360 video production.

Example 9 may include a method comprising:
receiving a plurality of video streams;
receiving a session description protocol (SDP) attribute to indicate one or more camera calibration parameters associated with the video streams; and
stitching the video streams together based on the one or more camera calibration parameters to generate an immersive video.

Example 10 may include the method of example 9 or some other example herein, wherein the video streams are real-time transport protocol (RTP) streams.

Example 11 may include the method of example 9-10 or some other example herein, wherein the video streams are two-dimensional video streams.

Example 12 may include the method of example 9-11 or some other example herein, wherein the one or more camera calibration parameters include one or more of: number of lenses, lens layouts, lens positions, lens angles, lens radius, lens resolutions, number of cameras, layout of the cameras, position of each camera (e.g., relative position represented by X,Y,Z translation from the rig center), angle and orientation of each camera (e.g., yaw, pitch, roll), resolution of each camera, focal length (angular pixel resolution) of each camera, principal point (center of projection) of each camera, lens distortion (deviation from ideal perspective or fisheye) of each camera.

Example 13 may include the method of example 9-12 or some other example herein, wherein the immersive video is a 360 degree video.

Example 14 may include the method of example 9-13 or some other example herein, wherein the immersive video has a view range of 180 degrees to 360 degrees.

Example 15 may include the method of example 9-14 or some other example herein, wherein the one or more camera calibration parameters include different camera calibration parameters for different respective video streams of the plurality of video streams.

Example 16 may include the method of example 9-15 or some other example herein, further comprising rendering the immersive video for display.

Example 17 may include the method of example 9-16 or some other example herein, wherein the method is performed by a teleconferencing system or a portion thereof.

Example 18 may include a method comprising:
  receiving a session description protocol (SDP) attribute to indicate that a bitstream included in an RTP-based media stream includes camera calibration parameters;
  obtaining the camera calibration parameters based on the SDP attribute; and
  processing the RTP-based media stream based on the camera calibration parameters.

Example 19 may include the method of example 18 or some other example herein, wherein the bitstream is a AVC or HEVC bitstream.

Example 20 may include the method of example 19 or some other example herein, wherein the camera calibration parameters are included in one or more SEI messages in the AVC or HEVC bitstream.

Example 21 may include the method of example 18-20 or some other example herein, wherein the camera calibration parameters include one or more of: number of cameras, angles, radius, resolutions, layouts and positions (e.g., relative position represented by X,Y,Z translation and rotation from the rig center); intrinsic parameters of each camera including one or more of: Field of View, principal point (center of projection), image and angular pixel resolution, lens distortion (deviation from ideal perspective or fisheye), image_height, image_width, center_x, center_y, and/or radius; and/or extrinsic parameters of each camera including one or more of: rotation angle (e.g., yaw, pitch, roll) and translation (X, Y, Z coordinates), center_azimuth, center_elevation, center_tilt, azimuth_range, and/or elevation_range.

Example 22 may include the method of example 18-21 or some other example herein, wherein the camera calibration parameters are included in a Multiview acquisition information SEI message for an AVC bitstream as per ISO/IEC 14496-10.

Example 23 may include the method of example 18-21 or some other example herein, wherein the camera calibration parameters are included in a Multiview acquisition information SEI message for an HEVC bitstream as per ISO/IEC 23008-2.

Example 24 may include the method of example 18-23 or some other example herein, further comprising receiving a plurality of RTP streams that correspond to 2D video bitstreams; processing the respective RTP streams based on corresponding camera calibration parameters; and stitching the RTP streams to generate an immersive video production.

Example 25 may include the method of example 18-24 or some other example herein, wherein the method is performed by a media production system or a portion thereof.

Example 26 may include the method of example 25 or some other example herein, wherein the media production system is a teleconferencing system.

Example 27 may include an apparatus comprising means to perform one or more elements of a method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 29 may include an apparatus comprising logic, modules, or circuitry to perform one or more elements of a method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example 32 may include a signal as described in or related to any of examples 1-26, or portions or parts thereof.

Example 33 may include a datagram, packet, frame, segment, protocol data unit (PDU), or message as described in or related to any of examples 1-26, or portions or parts thereof, or otherwise described in the present disclosure.

Example 34 may include a signal encoded with data as described in or related to any of examples 1-26, or portions or parts thereof, or otherwise described in the present disclosure.

Example 35 may include a signal encoded with a datagram, packet, frame, segment, protocol data unit (PDU), or message as described in or related to any of examples 1-26, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of examples 1-26, or portions thereof.

Example 37 may include a computer program comprising instructions, wherein execution of the program by a processing element is to cause the processing element to carry out the method, techniques, or process as described in or related to any of examples 1-26, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

TERMINOLOGY

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause a first device to:
   determine a first session description protocol (SDP) attribute, wherein the first SDP attribute indicates that a bitstream included in a real-time transport protocol (RTP)-based media stream includes camera calibration parameters;
   transmit, to a second device, the first SDP; and
   receive, from the second device, a second SDP attribute to answer the first SDP attribute.

2. The one or more NTCRM of claim 1, further comprising to:
   determine the camera calibration parameters that are based on one or more cameras associated with the first device;
   provide the bitstream, wherein the bitstream includes the determined camera calibration parameters; and
   transmit the (RTP)-based media stream that includes the bitstream to the second device.

3. The one or more NTCRM of claim 2, wherein the bitstream is an Advanced Video Coding (AVC) or High Efficiency Video Coding (HEVC) bitstream.

4. The one or more NTCRM of claim 2, wherein the camera calibration parameters are included in one or more supplemental enhancement information (SEI) messages in the bitstream.

5. The one or more NTCRM of claim 1, wherein the camera calibration parameters include one or more of: a number of cameras, or an angle, a radius, a resolution, a layout, or a position of one or more cameras.

6. The one or more NTCRM of claim 1, wherein the camera calibration parameters include one or more intrinsic parameters.

7. The one or more NTCRM of claim 6, wherein the intrinsic parameters include one or more of: a field of view, a principal point, an image and angular pixel resolution, a lens distortion (deviation from ideal perspective or fisheye), an image_height, an image_width, a center_x, a center_y, or a radius.

8. The one or more NTCRM of claim 1, wherein the camera calibration parameters include one or more extrinsic parameters.

9. The one or more NTCRM of claim 8, wherein the extrinsic parameters include one or more of: a rotation angle, a translation location, a center azimuth, a center elevation, a center tilt, an azimuth range, or an elevation_range.

10. The one or more NTCRM of claim 1, wherein the second device is a media production system.

11. The one or more NTCRM of claim 10, wherein the media production system is a teleconferencing system.

12. The one or more NTCRM of claim 1, wherein the first SDP attribute indicates immersive media capabilities of the first device.

13. The one or more NTCRM of claim 1, wherein the second SDP attribute indicates an answer of the first SDP attribute by the second device.

14. An apparatus comprising:
   one or more processors, wherein one or more cameras are coupled with the one or more processors;
   memory coupled with the one or more processors, wherein the memory includes instructions that, when executed by the one or more processors, are to:
   determine a first session description protocol (SDP) attribute, wherein the first SDP attribute indicates that a bitstream included in a real-time transport protocol (RTP)-based media stream includes camera calibration parameters;

transmit the first SDP to a second device; and receive, from the second device, a second SDP attribute to answer the first SDP attribute.

15. The apparatus of claim 14, wherein the instructions are further to:

determine the camera calibration parameters based on the one or more cameras;

provide the bitstream, wherein the bitstream includes the determined camera calibration parameters; and transmit the (RTP)-based media stream that includes the bitstream to the second device.

16. The apparatus of claim 14, wherein the bitstream is an Advanced Video Coding (AVC) or High Efficiency Video Coding (HEVC) bitstream, and wherein the camera calibration parameters are included in one or more supplemental enhancement information (SEI) messages in the bitstream.

17. The apparatus of claim 14, wherein the camera calibration parameters include one or more of: a number of cameras, or an angle, a radius, a resolution, a layout, or a position of one or more cameras.

18. The apparatus of claim 14, wherein the camera calibration parameters include one or more of: a field of view, a principal point, an image and angular pixel resolution, a lens distortion (deviation from ideal perspective or fisheye), an image_height, an image_width, a center_x, a center_y, or a radius.

19. The apparatus of claim 14, wherein the camera calibration parameters include one or more of: a rotation angle, a translation location, a center azimuth, a center elevation, a center tilt, an azimuth range, or an elevation_range.

\* \* \* \* \*